United States Patent [19]

Asami et al.

[11] Patent Number: 4,690,429

[45] Date of Patent: Sep. 1, 1987

[54] REAR SUSPENSION CONTROLLER

[75] Inventors: Ken Asami, Nagoya; Toshio Onuma, Susono; Kaoru Ohashi, Okazaki; Shuuichi Buma, Toyota, all of Japan

[73] Assignee: Toyota Jidosha Kabushiki Kaisha, Japan

[21] Appl. No.: 818,140

[22] Filed: Jan. 13, 1986

[30] Foreign Application Priority Data

Jan. 16, 1985 [JP] Japan .................................. 60-7248

[51] Int. Cl.⁴ .............................................. B60G 17/00
[52] U.S. Cl. ................................................... 280/707
[58] Field of Search ............... 200/707, DIG. 1, 6 H, 200/6 R, 705, 709; 188/299

[56] References Cited

U.S. PATENT DOCUMENTS

| | | | |
|---|---|---|---|
| 2,973,969 | 3/1961 | Thall | 280/124 |
| 3,003,783 | 10/1961 | Brueder | 280/707 |
| 3,632,131 | 1/1972 | Engfer | 280/707 |
| 4,162,083 | 7/1979 | Zabler | 280/703 |
| 4,350,354 | 9/1982 | Dotti et al. | 280/6 H |
| 4,364,574 | 12/1982 | Saito | 280/6 R |
| 4,402,375 | 9/1983 | Glaze | 280/707 |
| 4,513,833 | 4/1985 | Sheldon | 280/705 |
| 4,540,188 | 9/1985 | Meloche et al. | 280/6 R |
| 4,589,676 | 5/1986 | Meloche et al. | 280/707 |
| 4,593,920 | 6/1986 | Natsume et al. | 280/6 R |
| 4,634,143 | 1/1987 | Asami | 280/707 |

FOREIGN PATENT DOCUMENTS 5963218 9/1982 Japan .
58-30542 2/1983 Japan .
59-23712 2/1984 Japan .
59-26638 2/1984 Japan .

OTHER PUBLICATIONS

Mizuguchi, Masaaki et al., "Chassis Electronic Control Systems for the Mitsubishi 1984 Galant", Society of Automotive Engineers, Technical Paper No. 840258, 3184, 280-707.

Patent Abstract of Japan, vol. 8, No. 116 (M-299), [1553], May 30, 1984; & JP-A-5923712 (Hino Jidosha), 07-02-1983 (Cat. D,A).

*Primary Examiner*—John J. Love
*Assistant Examiner*—Karin L. Ferriter
*Attorney, Agent, or Firm*—Parkhurst & Oliff

[57] ABSTRACT

A new rear suspension controller is invented for improving a ride comfort or for improving controllability and stability when a vehicle passes a sporadic bump or dip of otherwise smooth road surface. It includes: a front vehicle height detector which measures a distance between the vehicle body and a front wheel; a first judgment means which detects a sporadic bump or dip by comparing the signal from the front vehicle height detector with a preset standard value; a rear vehicle height detector which measures a distance between the vehicle body and a rear wheel; a second judgment means which detects the bump or dip that the front wheel has passed; and a rear suspension characteristic alteration means which alters, for example, a spring constant of air suspensions, a dumping force of shock absorbers, stabilizer compliance, etc. when the first judgment means detected the bump or dip and returns the characteristic after the second judgment means judges that the rear wheel has passed it.

8 Claims, 31 Drawing Figures

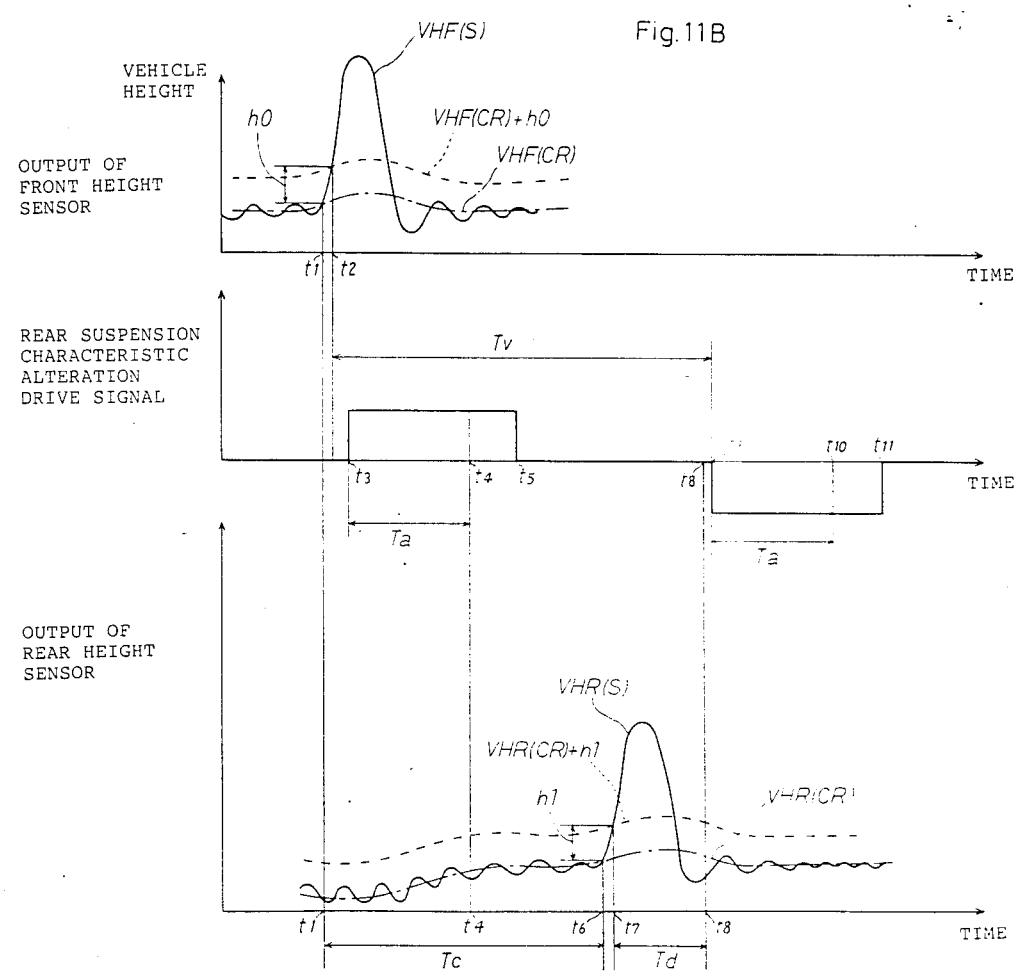

REAR SUSPENSION CONTROLLER

BACKGROUND OF THE INVENTION

1. Field of the Invention

The present invention relates to a rear suspension controller for a vehicle, particularly to a rear suspension controller which is effective against a shock caused by a sporadic bump or dip of a road surface on which the vehicle is running.

2. Prior Art

Conventionally, spring constant, damping force, bush characteristic or stabilizer characteristic of various suspension units provided between a vehicle body and its wheels is altered depending on conditions of the road surface or running conditions of the vehicle, not only to prevent the vehicle from having shocks or vibration for improving ride comfort but also to keep controllability and stability of the vehicle.

For example, there are inventions to alter the spring constant of air spring for an air suspension in response to the state of the road surface such as Published Unexamined Patent Application No. Sho 59-26638, those to alter the damping force of a shock absorber as well as the spring constant of an air spring such as Published Unexamined Patent Application No. Sho 59-23712, those to alter the damping force of a shock absorber only such as Published Unexamined Patent Application No. Sho 58-30542, those to alter just the ridigity of a bush such as Published Unexamined Utility Model Application No. Sho 59-132408 and those to alter the rigidity of a stabilizer such as Published Unexamined Utility Model Application Nos. Sho 59-129613 and 59-135213.

The above-mentioned controllers detect the bad driving condition of the road surface by a vehicle height sensor, alter a characteristic of each suspension, maintain the controllability and stability on the bad driving condition and prevent dive, squat, rolling, etc. in case of predicting the sudden change of vehicle posture e.g., dive, squat, rolling, etc. by brake lamp switch, throttle position sensor and steering sensor.

However, such prior controllers judge the bad driving condition only after the severe changes are detected continuously by the vehicle height sensor or the vehicle height alteration acceleration sensor in a predetermined period and alter the suspension characteristics for all the wheels so as to achieve a predetermined effect. In such cases, they do not alter the suspension characteristics when passing over other kinds of shock like a joint of road patches, a sporadic bump or dip of a road surface, because they resume running on a flat road after receiving a sporadic shock.

Accordingly, there are problems such as an the impossibility of preventing uncomfortable shock for passengers during running on a road surface with the above-mentioned sporadic bump or dip different from rough road running, and controllability, stability, characteristics of vibration and noise are deteriorated after passing over the bump or dip.

SUMMARY OF THE INVENTION

Accordingly, the primary object of this invention is to provide a novel rear suspension controller, which improves comfort of a ride when a vehicle is passing a sporadic bump or dip of a road surface.

The secondary object of this invention is to provide a rear suspension controller, which is controllable of rear suspension characteristic to improve the controllability, stability, vibration, noise, and comfort of a ride, whereby the so-called active control of rear wheels is realized when a vehicle is running on a normal road surface without obstacles.

The third object of this invention is to provide a rear suspension controller, which can improve comfort of a ride on rear seats rather than front ones, enables the adjustment of a suspension characteristic with a distinct difference between front and rear wheels, and increases the degree of freedom in setting the suspension characteristic.

To achieve the above-mentioned objects, the present invention proposes a rear suspension controller for a vehicle having a suspension between a vehicle body and a rear wheel including:

a front vehicle height detecting means (e) for measuring a distance between the vehicle body and a front wheel and for generating a front data signal;

a first judgment means (f) for comparing the front data signal with a first preset range and for generating a first judgment signal if the first data signal is out of the first preset range;

a rear vehicle height detecting means (g) for measuring distance between the vehicle body and a rear wheel and for generating a rear data signal;

a second judgment means (h) for comparing the rear data signal with a second preset range and for generating a second judgment signal if the rear data signal is out of the second preset range; and a rear suspension characteristic alteration means (i) for altering a rear suspension characteristic on receiving the first judgment signal and for returning the suspension characteristic to an unaltered state after receiving the second judgment signal.

The front or rear vehicle height detecting means (e) or (g) detects the distance between the vehicle body and the front or the rear wheel, respectively, to generate vehicle height data. The vehicle height data mean displacement of the front wheel, speed or acceleration of the displacement, or amplitude of the vehicle height vibration. In this invention, the sporadic bump and dip of the road surface is detected by the front and the rear wheels as the vehicle height data.

The first and the second judgment means (f) and (h) detect the vehicle height data from the value of the front and the rear vehicle heights respectively, set a preset range to alter each rear suspension characteristic and another preset range to restore the altered rear suspension characteristic, and compare with each vehicle height data.

The suspension characteristic is mainly referred to as a spring constant, a damping force of a shock absorber, bush and stabilizer properties of the suspension. The rear suspension characteristic alteration means (i) alters or restores the spring constant, the damping force of the shock absorber, the bush and the stabilizer properties when the first or the second judgment means (f) or (h) judges that the vehicle height data exceeds the preset range respectively, so that the rear suspension characteristic is controlled.

The action of this invention is hereinafter described referring to FIG. 2 which is a system diagram showing the condition that a vehicle (j) is driving on a road surface k having a bump (l) at a speed V. When the vehicle (j) is driving on the road surface k, a front wheel (d) rides on the bump (l) on the road surface k. Then, the alteration of the vehicle height is detected by a front vehicle height detector (e) which measures the distance between the front wheel (d) and a vehicle body (a) to generate a front vehicle height signal. The front vehicle height signal is input into the first judgment means (f). In case the first judgment means (f) judges that the alteration of the front vehicle height exceeds the preset range, the rear suspension characteristic alteration means (i) alters the characteristic of a suspension (c) of a rear wheel (b). The above-mentioned judgment and control action are accomplished from the time when the front wheel (d) is detected to ride on the bump (l) of the road surface k to the time when the rear wheel (b) passes the bump (l). Therefore, the rear wheel (b) gets over the bump (l) of the road surface k on condition that the suspension characteristic is altered.

When the rear wheel (b) is passing the bump (l) of the road surface k, the rear vehicle height detector (g) detects the alteration of the vehicle height to generate a rear vehicle height signal. The rear vehicle height signal is input into the second judgment means (h). In this case, the second judgment means (h) judges that the alteration of the rear vehicle height exceeds the preset range, whereby the rear suspension characteristic alteration means (i) restores the characteristic of the suspension (c) of the rear wheel (b).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing.

FIG. 11B is a timing chart for the case of FIG. 11A.

DESCRIPTION OF THE PREFERRED EMBODIMENT

Figure 1:
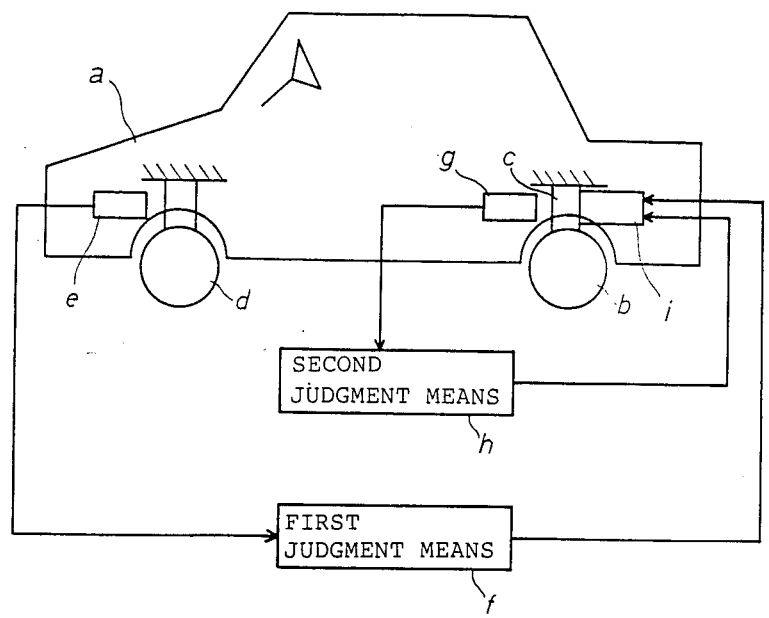
FIG. 1 is a schematic block diagram showing the basic idea of the present invention.
Figure 2:
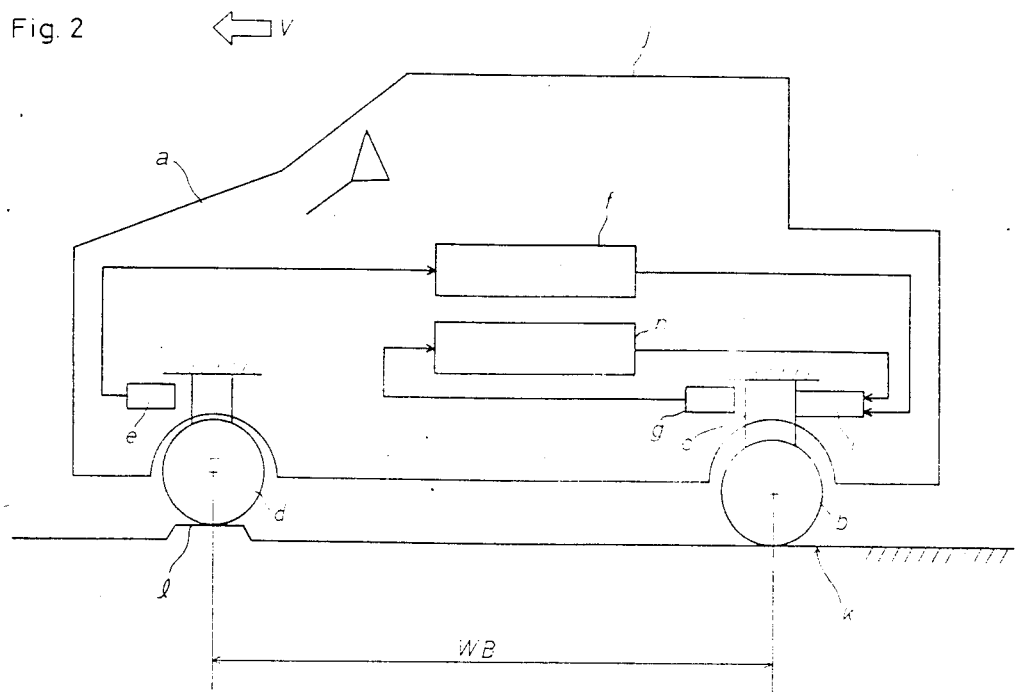
FIG. 2 is a reference view illustrating an action of the present invention.

Referring now to the drawings, wherein like reference numerals designate identical or corresponding parts throughout the several views.

Figure 3:
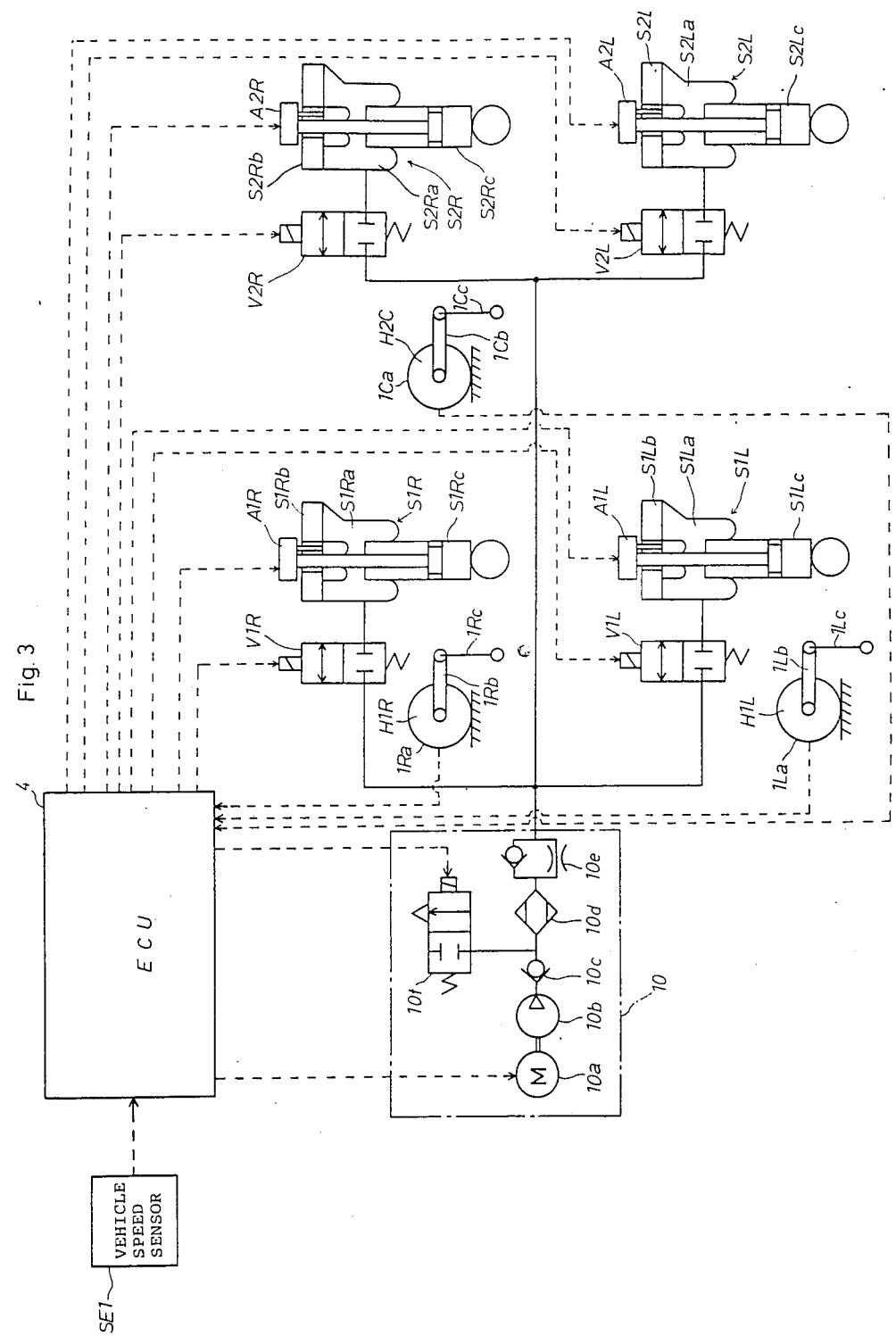
FIG. 3 is a system diagram showing the preferred embodiment.

FIG. 3 shows a rear suspension control unit for a vehicle adopting an air suspension, as one embodiment of this invention. A right front vehicle height sensor H1R is provided between a vehicle body and a right front wheel to detect the distance between the vehicle body and a right suspension arm which follows the motion of the wheel. A left front vehicle height sensor H1L is provided between the vehicle body and a left front wheel to detect the distance between the vehicle body and a left suspension arm. A rear vehicle height sensor H2C is provided between the vehicle body and a rear wheel to detect the distance between the vehicle body and a rear suspension arm. The short cylindrical bodies 1R$a$, 1L$a$ and 1C$c$ of the vehicle height sensors H1R, H1L and H2c are secured on the vehicle body. Links 1R$b$, 1L$b$ and 1C$b$ extend from the center shafts of the bodies 1R$a$, 1L$a$ and 1C$a$ almost perpendicularly to the center shafts.

Turnbuckles 1R$c$, 1L$c$ and 1C$c$ are rotatably coupled to one end of the links 1R$b$, 1L$b$ and 1C$b$ opposite the bodies 1R$a$, 1L$a$ and 1C$a$ respectively. The other end of the turnbuckles 1R$c$, 1L$c$ and 1C$c$ opposite the links are rotatably coupled to a portion of the suspension arms.

A potentiometer is provided in each body of the vehicle height sensors H1R, H1L and H2C. Electric resistance of the potentiometer changes in response to the rotation of the center shaft to output the vehicle height change in the form of a voltage change. Although the vehicle height sensors of the above-mentioned analog type are used in this embodiment, vehicle height sensors of other digital types may be used. The vehicle height sensors of the digital types have, for example, plural photo interrupters in the bodies to detect the vehicle height in such a way that a disk, which has a slit coaxial with the center shaft of the sensor, turns on or off the photo interrupters in response to the change in the vehicle height.

The followings are explanations of air suspensions S1R, S1L, S2R and S2L. The air suspension S2L is provided between the left rear suspension arm and the vehicle body in parallel with a suspension spring (not shown). The air suspension S2L is composed of a main air chamber S2L$a$ functioning as an air spring, an auxiliary air chamber S2L$b$, a shock absorber S2L$c$, and an actuator A2L for altering the spring constant and the damping force of the shock absorber. The air suspensions S1R, S1L and S2R have the similar components and functions to the above-mentioned air suspension S2L, and are provided for the right front wheel, the left front wheel, and the right rear wheel, respectively.

A compressed air feed and discharge system 10 for an air spring of the air suspensions S1R, S1L, S2R and S2L operates a motor 10a to drive a compressor 10b for generating compressed air. The compressed air is led to an air drier 10d via a check valve 10c, where the compressed air moves from the compressor 10b side to the air drier 10d side. The air drier 10d functions to dry each compressed air supplied for the air suspensions S1R, S1L, S2R and S2L and to protect every part of the air suspension S1R, S1L, S2R and S2L from moisture, besides preventing abnormal pressure change accompanied with the corresponding phase change in each of main air chambers S1Ra, S1La, S2Ra and S2La and auxiliary air chambers S1Rb, S1Lb, S2Rb and S2Lb. In a check valve 10e the compressed air moves from the compressor 10b side to each of the air suspensions S1R, S1L, S2R and S2L side. The check valve 10e opens its checking portion in feeding the compressed air, and closes its checking portion in discharging the compressed air to discharge the compressed air through the fixed restriction. A discharging valve 10f is an electromagnetic valve of 2-port 2-position spring off-set type. Normally, the discharging valve 10f interrupts the air passage shown in FIG. 3, but in discharging the compressed air from the air suspension S1R, S1L, S2R and S2L, the discharging valve 10f changes to connect the air passagas and discharge the compressed air to the atmosphere via the check valve 10e with the fixed restriction and the air drier 10d.

Air spring feed and discharge valves V1R, V1L, V2R and V2L have functions to adjust the vehicle height, and are provided between the air suspensions S1R, S1L, S2R and S2L, and the above-mentioned compressed air feed and discharge system 10, respectively. The air spring feed and discharge valves V1R, V1L, V2R and V2L are 2-port and 2-position electromagnetic valves of spring off-set type. The air spring feed and discharge valves V1R, V1L, V2R and V2L normally interrupt the air passage shown in FIG. 3, and connect the air passage in adjusting the vehicle height. Namely, if the air spring feed and discharge valves V1R, V1L, V2R and V2L connect the air passage, the compressed air can be fed or discharged between the main air chambers S1Ra, S1La, S2Ra and S2La. If the air is fed, the volumes in the main air chambers S1Ra, S1La, S2Ra and S2La are increased to raise the vehicle height, and if the air is discharged due to the vehicle weight itself, the volumes thereof are decreased. In addition, if the feed and discharge valves V1R, V1L, V2R and V2L interrupt the air passage, the vehicle height remains unchanged. Thus, to control the connection and disconnection between the above-mentioned discharging valve 10f of the compressed air feed and discharge system and each of above-mentioned feed and discharge valves V1R, V1L, V2R, and V2L make it possible to adjust the vehicle height by altering the volumes of the main air chambers of the air suspensions S1R, S1L, S2R and S2L respectively.

A vehicle speed sensor SE1 is provided in a speedometer and outputs signals in response to the vehicle speed. Each signal output from the vehicle height sensor H1R, H1L, H2C and the vehicle speed sensor SE1 is input to an electronic control unit (ECU) 4. ECU 4 is input the signals to process the data and performs the proper controls at need, whereby ECU 4 outputs driving signals to the air suspension actuators A1R, A1L, A2R and A2L, to the air spring feed and discharge valves V1R, V1L, V2R and V2L, and to the solenoids for the compressed air feed and discharge system 10.

Figure 4:
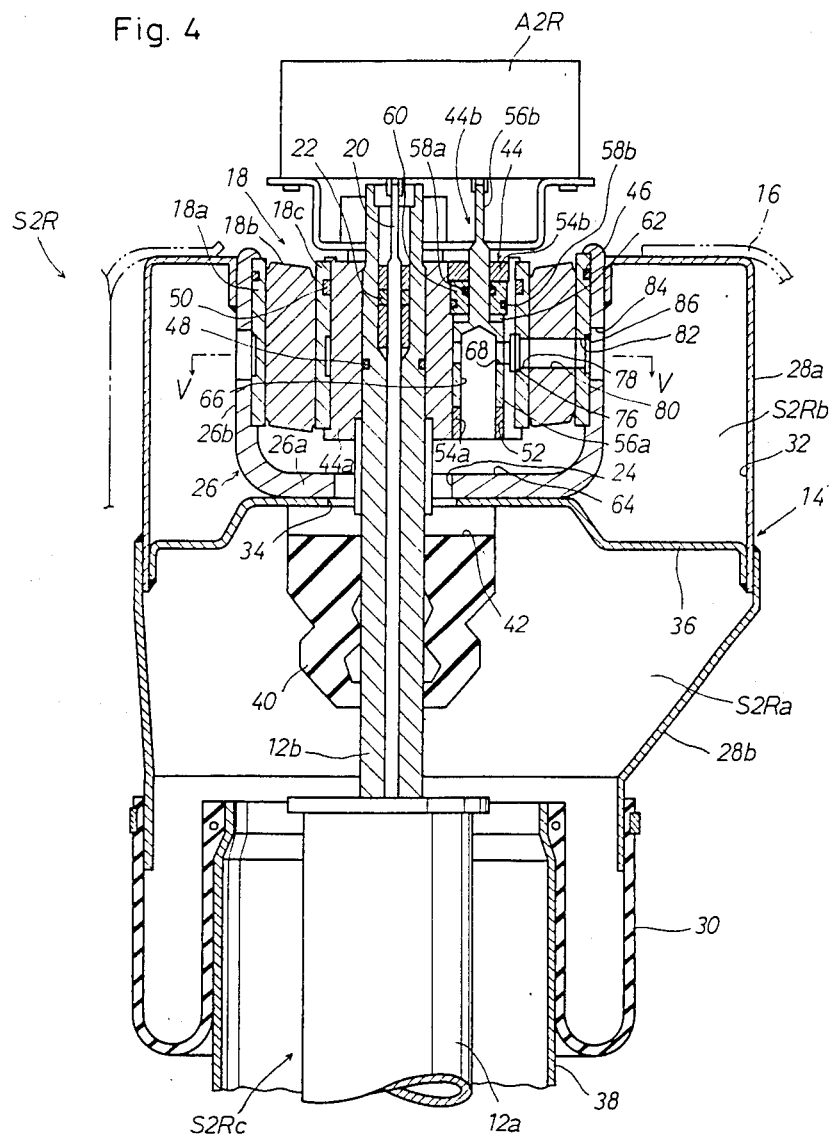
FIG. 4 is a sectional view of the main part of an air suspension of the preferred embodiment.
Figure 5:
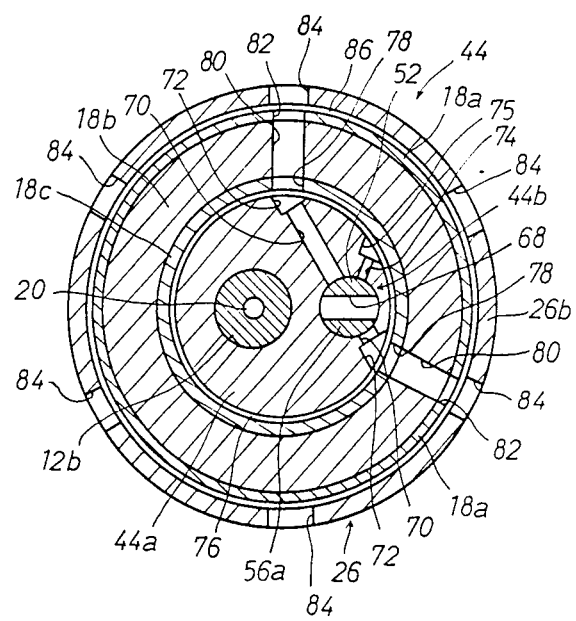
FIG. 5 is a cross-sectional view along a line V—V shown in FIG. 4.

The followings are the explanations of the systems of the main parts which constitute the air suspensions S1R, S1L, S2R and S2L on the basis of FIGS. 4 and 5. Each suspension has a system similar to each other. The right rear air suspension S2R is hereinafter described in detail.

The air suspension S2R includes a shock absorber S2Rc composed of a piston and a cylinder, and an air spring unit 14 provided in connection with the shock absorber, shown in FIG. 4. An axle (not shown) is supported at the lower end of the cylinder 12a of the shock absorber S2Rc. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber S2Rc is a buffer whose damping force can be varied for adjustment by operating the valve function of the piston. A control rod 20 for adjusting the damping force is liquid tight and rotatably fitted with a sealing member 22 in the piston rod 12b.

The air spring unit 14 has a chamber 32 which is defined by a circumferential member 26 comprising a bottom 26a provided with an opening 24, through which the piston rod 12b is allowed to extend, and a wall 26b rising from the peripheral portion of the bottom 26a, an upper housing member 28a covering the circumferential member 26 and secured on the vehicle body, a lower housing member 28b open at the lower end and coupled to the lower end of the upper housing member 28a, and a diaphragm 30 made of an elastic material and closing the lower end of the lower housing member 28b. The chamber 32 is divided into a lower main air chamber S2Ra and an upper auxiliary air chamber S2Lb by a partition member 36 secured on the bottom 26a of the circumferential member 26 and having an opening 34 corresponding to the opening 24 provided in the bottom 26a. Both the chambers S2La and S2Lb are filled with compressed air. The partition member 36 is fitted with a buffer rubber 40 which can be brought into contact with upper end of the cylinder 12a. The buffer rubber 40 has a passage 42 for connecting the openings 24 and 34 to the main air chamber S2La.

The elastic cylindrical assembly 18 is disposed inside the circumferential member 26 whose wall 26b defines the inside circumferential surface of the auxiliary air chamber S2Rb, in such manner that the assembly 18 surrounds the piston rod 12b. The cylindrical elastic assembly 18 is provided with a valve unit 44 for controlling the connection of both the air chambers S2Ra and S2Rb. The assembly 18 includes an outer cylinder 18a, a cylindrical elastic member 18b and an inner cylinder 18c which are disposed concentrically to each other. The cylindrical elastic member 18b is secured on both the cylinders 18a and 18b. The outer cylinder 18a of the assembly 18 is press-fitted on the wall 26b of the circumferential member 26 secured on the vehicle body, under the action of the upper housing member 28a. The valve casing 44a of the valve unit 44, through which the piston rod 12b is allowed to extend, is secured on the inner cylinder 18c. Since the piston rod 12b is secured on the valve casing 44a, the piston rod is elastically supported to the vehicle body by the cylindrical elastic assembly 18. An annular air sealing member 46 is tightly packed in between the outer cylinder 18a and the bottom 26b of the member 26. An annular air sealing member 48 is tightly packed in between the piston rod 12b and the valve casing 44a. An annular air sealing member 50 is tightly packed in between the inner cylinder 18c and the valve casing 44a.

The valve casing 44a has a hole 52 which is open at both the end sand extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding at inner air sealing member 58a and an outer air sealing member 58b for tightly closing the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which communicates with the main air chamber S2La through the openings 24 and 34 and the passage 42 of the buffer rubber 40, is formed in the lower portion of the elastic cylindrical assembly 18. The main portion 56a of the valve 44b has a recess 66 open to the chamber 64, and has a connection passage 68 extending through the main portion 56a is a diametrical direction thereof across the recess 66.

The valve casing 44a, which houses the valve 44b, has a pair of air passages 70, each of which can collect at one end with the connection passage 68, as shown in FIG. 5. The air passages 70 extend on almost the same plane outwards in a diametrical direction of the hole 52, toward the peripheral surface of the valve 44b. The other end of each air passage 70 is open to the peripheral surface of the valve casing 44a through a face hole 72. An air passage 74, which can connect at one end with the connection passage 68, extends on almost the similar place to the pair of air passages 70 toward the peripheral surface of the valve casing 44a, between the pair of air passages 70 outside the hole 52. The diameter of the air passage 74 is smaller than that of each of the air passages 70. The other end of the air passage 74 is open to the peripheral surface of the valve casing 44a through a face hole 75. The inside circumferential surface of the inner cylinder 18c covering the peripheral surface of the valve casing 44a has an annular recess 76 which surrounds the peripheral surface of the valve casing to connect the face holes 72 and 75 for the air passages 70 and 74 to each other.

The inner cylinder 18c has an opening 78 which extends continuously to the recess 76 which constitutes an annular air passage. The cylindrical elastic member 18b has through holes 80, which extend outwards in the radial direction of the member 18b correspondingly to the openings 78. The through holes 80 are made open to the peripheral surface of the outer cylinder 18a through the openings 82 of said cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a are provided with plural openings 84 which are located at equal intervals in the circumferential direction of the member 26 and extend continuously to the auxiliary air chamber S2Rb to connect the openings 78 and 82 and the through holes 80 to the auxiliary air chamber S2Lb. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

Although the openings 78 and 82 and the through holes 80 are provided correspondingly to the two air passages 70 of the valve casing 44a in the embodiment shown in FIG. 5, the air passages 70 and 74 can be provided in optional positions in the circumferential direction of the elastic member 18b because the annular air passage 76, with which the air passages 70 and 74 communicate, is formed between the inner cylinder 18c and the valve casing 44a.

A control rod 20 for adjusting the damping force of the shock absorber S2Rc, and a prior actuator A2R for rotating the valve 44b of the valve unit 44, are provided at the upper end of the piston rod 12b, as shown FIG. 4.

Since the air suspension S2R has the above-mentioned construction, the air suspension performs actions described hereinafter. When the valve 44b is kept in such a closed position shown in FIG. 5 that the connection passage 68 of the valve does not connect with any of the air passages 70 and 74 of the valve casing 44a, the main air chamber S2Ra and the auxiliary air chamber S2Rb are disconnected from each other so that the spring constant of the suspension 3 is set at a large value.

When the actuator A2R has rotated the valve 44b into such a position that the connection passage 68 of the valve connects with the large-diameter air passages 70 of the valve casing 44a, the main air chamber S2Ra is connected to the auxiliary air chamber S2Rb through the connection passage 68 communicating with the main air chamber, the large-diameter air passages 70 and the openings 78 and through holes 80 of the elastic assembly 18 and the openings 82 and 84, so that the spring constant of the suspension S2R is set at a small value.

When the valve 44b is rotated into such a position by the regulated actuator A2R that the connection passage 68 of the valve connects with the small-diameter connection passage 74 of the valve casing 44a, the main air chamber S2Ra is connected to the auxiliary air chamber S2Rb through the connection passage 68 connecting with the main air chamber, the small-diameter air passage 74, the air passage 76, the openings 78 and through holes 80 of the elastic assembly 18 and the openings 82 and 84, so that the spring constant of the suspension 3 is set at an intermediate value because the small-diameter air passage 74 provides a higher air flow resistance than the large-diameter air passages 70.

Figure 6:
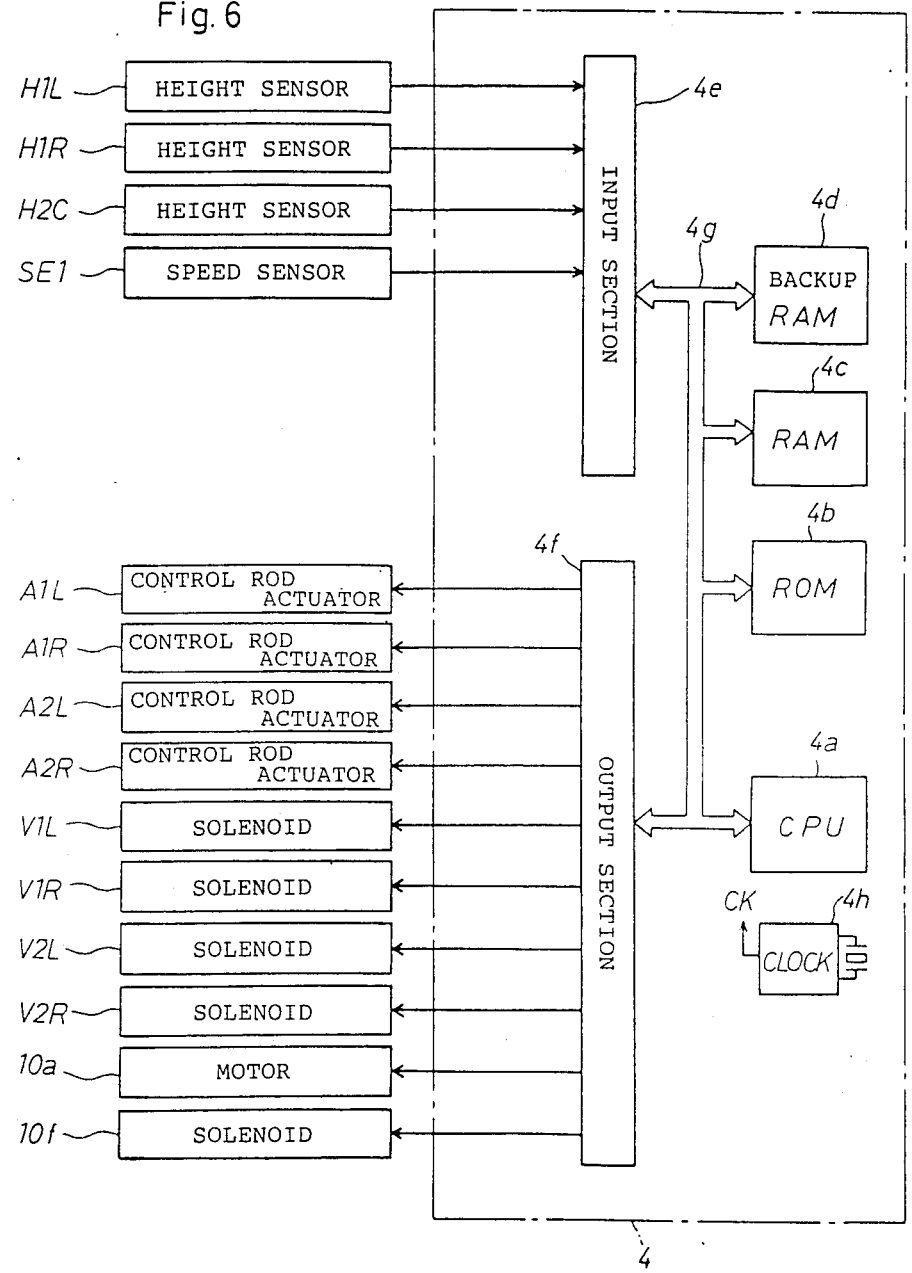
FIG. 6 is a block diagram of an electronic control unit.

FIG. 6 shows the system of ECU 4. A central processing unit (CPU) 4a receives the output data from the sensors and performs operations on the data, in response to a control program, to carry out processings for the control of various units or means or the like. A read-only memory (ROM) 4b stores the control program and initial data. A random-access memory (RAM) 4c stores or reads out the data, which are entered in ECU 4, or are necessary for operation control. A backup random-access memory (backup RAM) 4d is backed up by a battery so that even if the ignition key switch of the automobile is turned off, the backup RAM retains data which are needed after the turning-off of the switch. An input section 4e includes an input port (not shown), a waveshaping circuit provided if necessary, a multiplexer which selectively sends out the output signals of the sensors to CPU 4a, and an A/D converter which changes an analog signal into a digital signal. An output section 4f includes an output port (not shown), and a drive circuit for driving the actuators in response to the control signals of CPU 4a as occasion demands. A bus 4g connects circuit components such as CPU 4a and ROM 4b, the input section 4e and the output section 4f to one another to transmit the data. A clock circuit 4h sends out a clock signal at preset intervals to CPU 4a, ROM 4b, RAM 4c so that a control timing is set by the clock signal.

Figure 7:
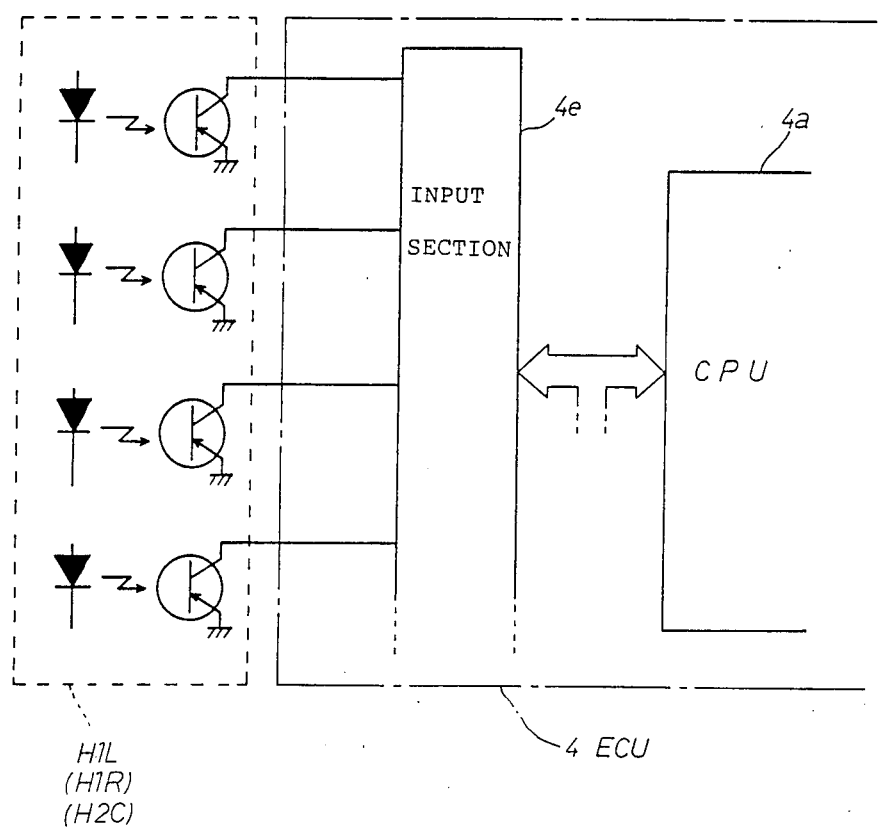
FIG. 7 is a block diagram of an input circuit for a digital vehicle height signal.
Figure 8:
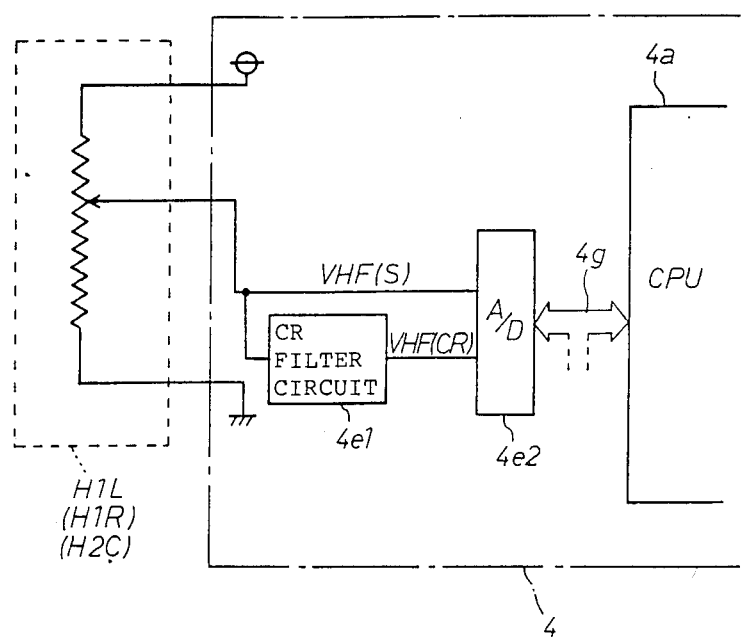
FIG. 8 is a block diagram of an input circuit for an analog vehicle height signal.

If the vehicle height sensors H1R, H1L and H2C are such that with plural photo interrupters output digital signals, the signals are transmitted to CPU 4a through the input section 4e as shown in FIG. 7. If the vehicle height sensors H1R, H1L and H2C output analog signals, a system shown in FIG. 8 is provided. In the latter case, the vehicle height sensors H1R, H1L and H2C send out the analog signal of a voltage corresponding to the vehicle height. The analog voltage signal is converted into a voltage VHF(CR) indicating a mean vehicle height, by a CR filter circuit 4e1 which is a low-pass filter. The voltage VHF(CR) is applied to an A/D converter 4e2. The analog voltage signal is also directly applied as a voltage VHF(S) indicating the current vehicle height, to the A/D converter 4e2. The converter 4e2 changes both the input signals into the digital signals through the action of a multiplexer. The digital signals are transmitted to CPU 4a via the bus 4g. The same thing applies to the left front vehicle height sensor H1L.

The process steps, which are performed by ECU 4, are hereinafter described with flowcharts shown in FIGS. 9A and 9B. The flowcharts indicate the process steps performed by ECU 4 in response to the vehicle height sensors H1R, H1L and H2C of the linear type which send out the analog signals, as shown in FIG. 8. The process steps are repeated in a preset time, e.g. in every 5 msec.

The outline of the flowcharts is hereinafter described. Each number of three figures in the parentheses indicates the numeral of each step.

(1) A current front vehicle height VHF(S) and a current rear vehicle height VHR(s) are detected (106).

(2) Mean front and rear vehicle height VHF(CR) and VHR(CR) are detected (108).

(3) It is judged whether or not the current front vehicle height VHF(S) has displaced more than a predetermined value h0 from the mean front vehicle height VHF(CR)(116).

(4) If the current front vehicle height VHF(S) has displaced more than the predetermined value h0, the rear suspension characteristic is altered to 'SOFT' (122) in order to get over the bump or dip of the road surface, especially to prevent the rear portion from having shocks and to improve comfort of the ride. Namely, in the above-mentioned air suspensions S2R, S2L, the main air chambers S2Ra and S2La and the auxiliary air chambers S2Rb and S2Lb are connected to each other to decrease the spring constant by activating the actuator A2R and A2L or the damping force of the shock absorbers S2Rc and S2Lc, is decreased.

(5) It is judged whether or not the current rear vehicle height VHR(S) has displaced more than the preset value h1 from the mean rear vehicle height VHR(CR). If the current rear vehicle height VHR(S) has displaced more than the value h1, it is judged that the rear wheel has reached the bump or dip which the front wheel has passed (128).

(6) The rear suspension characteristic is returned to the original state for coping with the normal driving condition (138).

The above-mentioned operations (1)–(6) correspond to the main process steps for producing the effect of the present invention in the embodiment. The details of the process steps are hereinafter described. It is first judged whether or not the process steps are being performed for the first time since the activation of ECU 4 (100). If the process steps are judged to be being performed for the first time, an initial setting is effected (102), namely, all variables are cleared and all flags are reset. After the initial setting is effected (102) or if the process steps in the routine are judged to be being performed for the second time or later, a current vehicle speed V is detected (104) in terms of the output signal of the vehicle speed sensor SE1.

Then, the current front and rear vehicle height VHF(S) and VHR(S) are detected (106). To detect the current vehicle height, either of the output signals from the right or left front vehicle height sensors H1R and H1L may be used. Since rear wheels receive a shock whichever of the front wheels has moved up or down due to the bump or dip of the road surface, the mean value of the output signals from both right and left vehicle height sensors H1R and H1L, or the larger one may be used. The current rear vehicle height VHR(S) is detected from the signal which is output from the rear vehicle height sensor H2C.

Then, the mean front and rear vehicle heights are detected (108). In this embodiment, the mean front and rear vehicle heights VHF(CR) and VHR(CR) are directly determined from the output signals from the vehicle height sensors H1R, H1L and H2C through the CR filter circuit 4e1 made of the low-pass filter and A/D converter 4e2, as shown in FIG. 8. If the vehicle height sensors H1R, H1L and H2C send out the digital signals, the mean vehicle height may be calculated from past vehicle heights VHF(S) and VHR(S) in ECU 4. Namely, the calculation can be effected by adopting process steps shown in FIG. 10, instead of adopting the process Steps 106 and 108 shown in FIG. 9A. In the process steps shown in FIG. 10, the current front and rear vehicle heights VHF(S)n and VHR(S)n are detected first (300, 302), and the mean values VHFa,n and VHRa,n are then calculated (306–312) in every predetermined operation unit time tms (304). In Step 306, the following calculation is performed:

$$VHF_{a,n} = \{(k-1)VHF_{a,n-1} + VHF_{b,n-1} + VHF(S)_n\}/k$$

k: Number of measured values to be averaged
$VHF_{a,n}$: Mean to be calculated currently (n-th time)
$VHF_{a,n-1}$: Mean calculated previously ((n−1)-th time)
$VHF(S)_n$: Measured value of current front vehicle height VHFb,n−1: Value calculated previously for convenience to calculate the mean VHFa,n In Step 308, the value VHFb,n is calculated as follows:

$$VHFb,n = mod(k)\{(k-1)VHFa,n-1 + VHFb,n-1 + VHF(S)n\}$$

In such calculation, mod(A){B} corresponds the value of the remainder in the division of B by A.

In Step 310, the following calculation is performed:

$$VHRa,n = \{(k-1)VHRa,n-1 + VHRb,n-1 + VHR(S)n\}/k$$

k: Number of measured values to be averaged
VHRa,n: Mean to be calculated currently (n-th time)
VHRa,n−1: Mean calculated previously (n−1)-th time
VHR(S)n: Measured value of current rear vehicle height
VHRb,n−1: Value calculated previously for convenience to calculate the mean VHRa,n In Step 312, the above-mentioned VHRb,n is calculated as follows:

$$VHRb,n = mod(k)\{(k-1)VHRa,n-1 + VHRb,n-1 + VHR(S)n\}$$

The process Steps 306-312 are a simple method to calculate the mean value of VHFa,n, VHFa,n−1, VHFb,n−1, VHRa,n, VHRa,n−1 and VHRb,n−1 which are just stored in the memory. The memory and the time of calculation are reduced, because each of the (k−1) data of front and rear vehicle heights is not necessarily all stored in the memory.

Figure 9A:
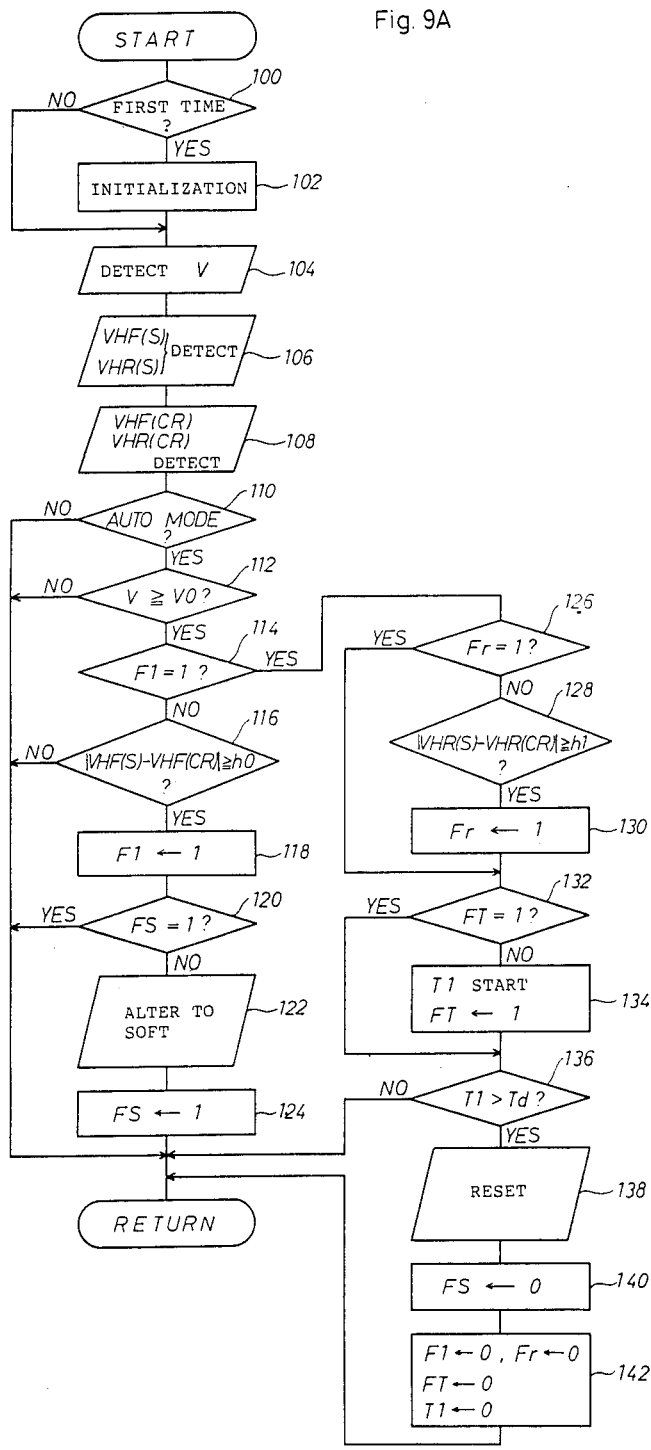
FIGS. 9A and 9B are flowcharts showing process steps performed by the electronic control unit shown in FIG. 6.
Figure 9B:
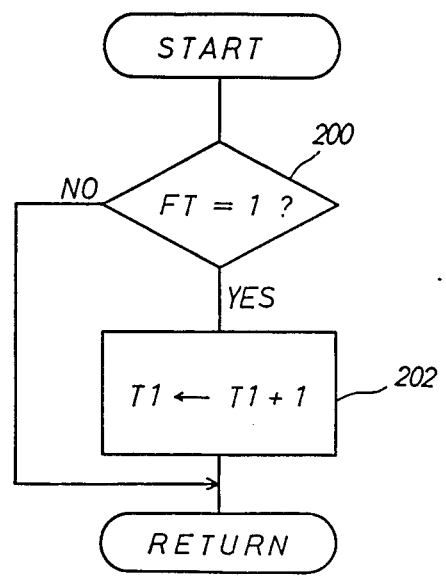
Figure 10:
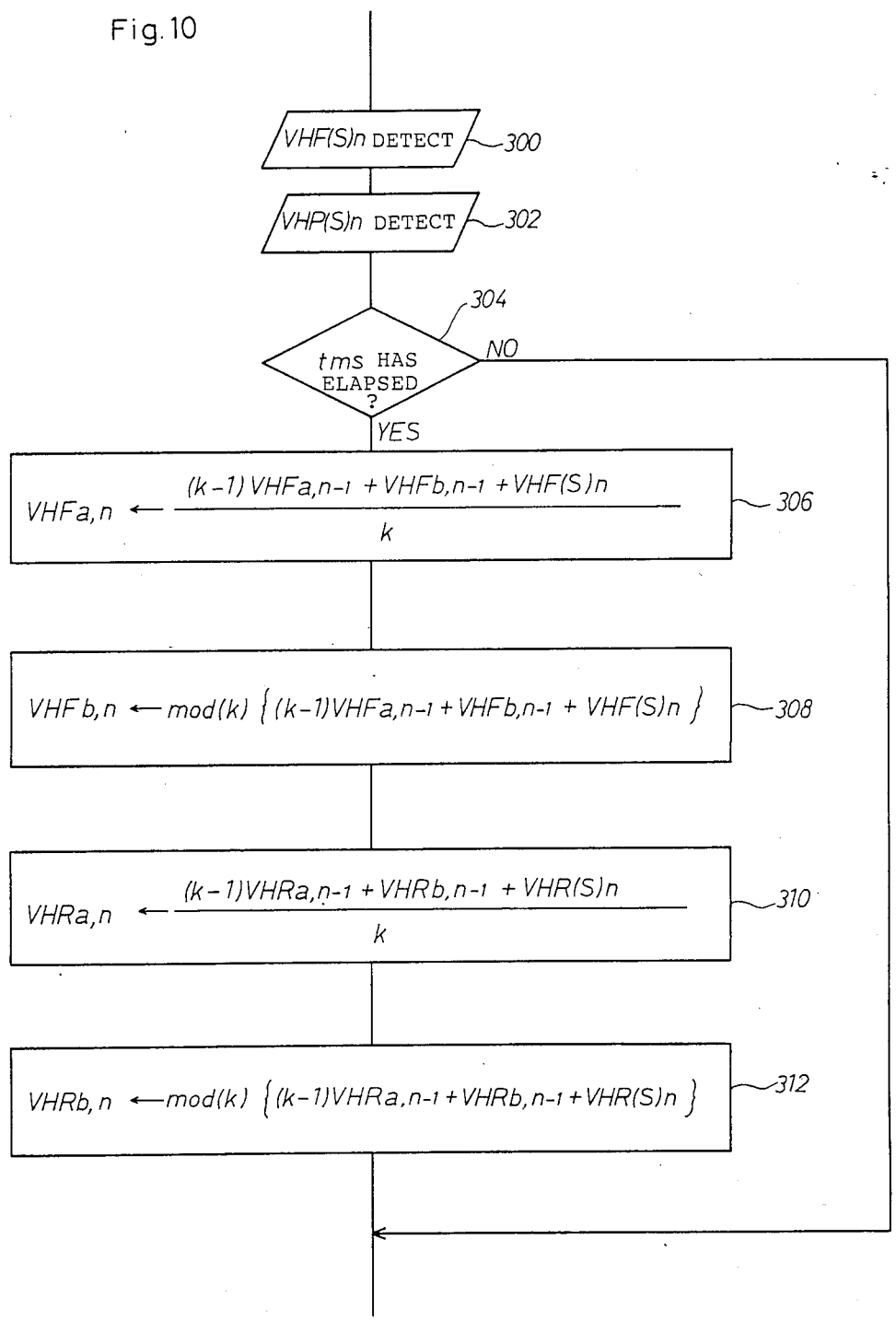
FIG. 10 is a flowchart for calculating a mean value in the preferred embodiment.

After the detection of the mean (108) as shown in FIG. 9A, it is judged whether or not the control of each suspension is in an automatic mode (110). Only if the automatic mode is selected by a driver by a manual switch, the following rear suspension control is to be performed. It is judged whether or not the vehicle is moving (112), namely, the current vehicle speed, which is detected by the vehicle speed sensor SE1 (104), and reference speed V0 are compared (112). If the vehicle is judged to be moving, the following control is to be performed.

In Step 114, the state of a flag F1 is judged. The flag F1 shows the control of the rear suspension characteristic. In this case (F1=0), the process steps are advanced to Step 116, where it is judged whether or not the difference between the current front vehicle height VHF(S) and the mean front vehicle height VHF(CR) exceeds a front obstacle judgment vehicle height h0 (116). If the above-mentioned condition is not satisfied, the process steps are terminated. If the above-mentioned condition is satisfied (116), ECU 4 judges that the front wheel has begun to traverse the bump or dip of the road surface, and the process steps are advanced to Step 118, where the flag F1 is set to show the control of the rear suspension characteristic. Then, the process steps are advanced to Step 120, where the state of a flag FS is judged. The flag FS shows whether or not the rear suspension characteristic is in the 'SOFT' state. In this case (FS=0), the process steps are advanced to Step 122, where the rear suspension characteristic is changed to the 'SOFT' state. Namely, the control signal is output from ECU 4 to the actuators A2R and A2L, the valve 44b is rotated, the main air chambers S2Ra and S2La and the auxiliary air chambers S2Rb and S2Lb of the air suspensions S2R and S2L are connected to each other by a large passage, whereby the spring constant is decreased and the rear suspension characteristic is to be in the 'SOFT' state. Then, the process steps are advanced to Step 124, where the flag FS is set to show that the rear suspension characteristic is in the 'SOFT' state, and the process steps are returned to Step 100.

The process steps are advanced to Steps 100-114. In this case (F1=1), the process steps are advanced to Step 126, where the state of a flag Fr is judged. The flag Fr shows that the alteration of the rear vehicle height exceeds the preset range. In this case (Fr=0), the process steps are advanced to Step 128, where it is judged whether or not the difference between the current rear vehicle height VHR(S) and the mean rear vehicle height VHR(CR) exceeds the rear obstacle judgment vehicle height h1. In this condition, it is judged that the rear wheel has begun to traverse the bump or dip which the front wheel has passed. In the above-mentioned condition (128), the process steps are advanced to Step 130, where the flag Fr is set. Then, the process steps are advanced to Step 132, where the state of a flag FT is judged. The flag FT shows that the timer is counted up. In this case (FT=0), the process steps are advanced to Step 134, where counting up a timer T1 is started to measure a restore time interval Td which elapses to restore the rear suspension characteristic, and the flag FT is set. The timer T1 is counted up by an interrupt routine shown in FIG. 9B. Namely, in Step 200 the state of the flag FT is judged, and the process steps are advanced to Step 202 in which the timer T1 is being counted up if FT=1.

Returning to FIG. 9A, the process steps are advanced to Step 136, where it is judged whether or not the value of the Timer T1 exceeds the value of the restore time interval Td. If the above-mentioned condition is not satisfied, the process steps are returned to Step 100.

The process steps are advanced to Steps 100-114, 126, 132 and 136, while the timer T1 is counted up. After the restore time interval Td elapses, the process steps are advanced to Step 138, where it is judged that the rear wheel has passed the bump or dip which the front wheel has passed, and the rear suspension characteristic is returned to the original state. Namely, the control signal is output from ECU 4 to the actuators A2R and A2L, the valve 44b is rotated, and the main air chambers S2Ra and S2La and the auxiliary air chambers S2Rb and S2Lb of the air suspensions S2R and S2L are connected to each other by a small passage, whereby the spring constant is restored and the rear suspension characteristic is returned to be in the 'NORMAL' state (138). Then, the process steps are advanced to Step 140, where the flag FS showing that the rear suspension characteristic is in the 'SOFT' state is reset. Then, the process steps are advanced to Step 142, where a flag F which shows the control of the rear suspension characteristic, the flag Fr which shows that the alteration of the rear vehicle height exceeds the preset range, the flat FT which shows that the timer T1 is being counted up, and the timer T1 are reset, and the process steps are returned to Step 100. After this, the above-mentioned process steps are repeated.

Figure 11A:
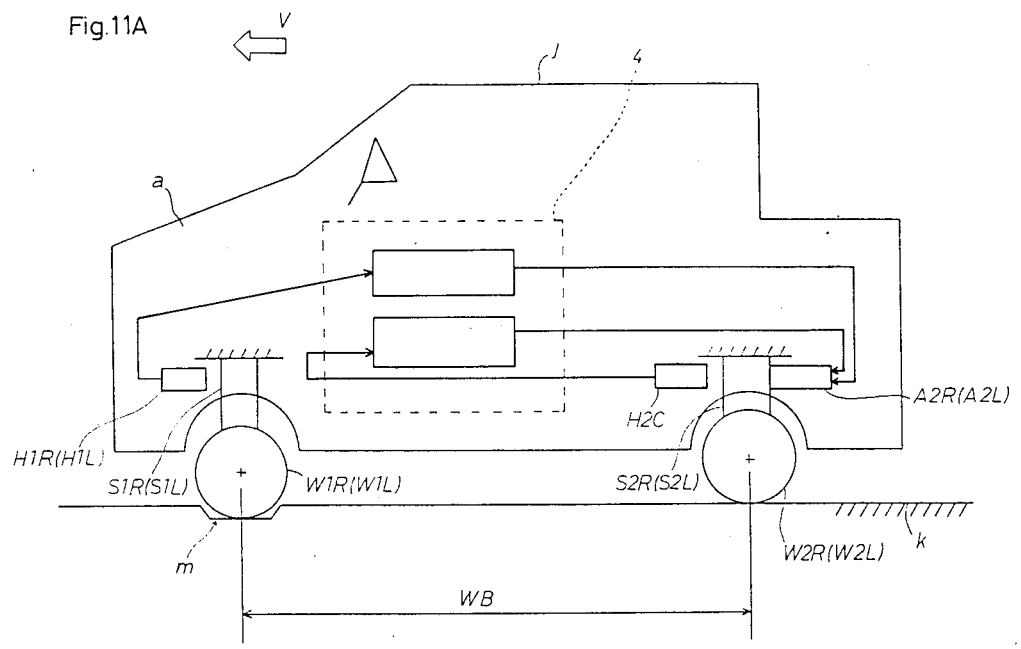
FIG. 11A is a reference view illustrating a vehicle getting over a dip of a road surface.

An example of the timing for the control in this embodiment is hereinafter described with FIGS. 11A and 11B. FIG. 11A is a reference view illustrating a state that a front wheel W1R(W1L) is sinking in a dip (m) of the road surface (k) while the vehicle (j) is driving at the speed V. FIG. 11B is timing charts showing an output of the front vehicle height sensor, electric current for driving the actuator for altering the rear suspension characteristic, and an output of the rear vehicle height sensor in accordance with the lapse of time.

In this case, the front wheel W1R (W1L) begins to traverse the dip (m) when the vehicle (j) is driving on the plane road surface k shown in FIG. 11A, at a time point t1 shown in FIG. 11B. After the time point t1, the output VHF(S) from the front vehicle height sensor H1R (H1L) increases apart from the mean front vehicle height VHF(CR) to reach the front obstacle judgment vehicle height VHF(CR)+h0 at a time point t2, when ECU 4 judges that the front vehicle height data exceeds the preset range. At a time point t3 just after the time point t2, ECU 4 generates and sends out a control signal so that the rear suspension characteristic alteration actuators A2R and A2L change the suspension characteristic to the 'SOFT' state, whereby the rear suspension characteristic alteration actuator A2R and A2L operate, and the main air chambers S2R$a$ and S2L$a$ and the auxiliary air chamber S2L$b$ and S2R$b$ of the rear air suspensions S2L and S2R are connected with each other through the large passage, so that the spring constant is to be decreased and the rear suspension characteristic is to be in the 'SOFT' state. The above-mentioned process steps to change the rear suspension characteristic are accomplished from the time point t3 to a time point t4 when a time interval Ta elapses. The time interval Ta is needed to change the suspension characteristic. The electric current for driving the actuators A2R and A2L is sent until a time point t5.

As mentioned in the above, at a time point t6, the rear wheel W2R (W2L) begins to traverse the dip (m). After the time point t6, the output VHR(S) from the rear vehicle height sensor H2C increases apart from the mean rear vehicle height VHR(CR), to reach the rear obstacle judgment vehicle height VHR(CR)+h1 at a time point t7, when ECU 4 judges that the rear wheel gets over the dip. At a time point t8 after the restore time interval Td elapses since the time point t7, the rear wheel W2R (W2L) passes the dip (m) and the vehicle drives on the plane road surface. Therefore, at a time point t9 just after the time point t8, ECU 4 generates and sends out the control signal so that the rear suspension characteristic alteration actuators A2R and A2L restore the suspension characteristic to the original state, whereby the rear suspension characteristic alteration actuators A2L and A2R operate, and the main air chambers S2L$a$ and S2R$a$ and the auxiliary air chambers S2L$b$ and S2R$b$ of the rear air suspensions S2L and S2R are connected with each other through the small passage, so that the air spring constant is to be returned to the 'NORMAL' state. The above-mentioned process steps to change the rear suspension characteristic are accomplished from the time point t9 to a time point t10 when the time interval Ta elapses. The electric current for driving to the actuators A2R and A2L is sent until a time point t11.

The front vehicle height detector (e) corresponds to the front vehicle height sensors H1R and H1L; the rear vehicle height detector (g) to the rear vehicle height sensor H2C; the rear suspension characteristic alteration means (i) to the actuators A2R and A2L, the compressed air feed and discharge system 10, the air spring feed and discharge valves V2L and V2R, and ECU 4; and the first and second judgment means (f) and (h) to ECU 4; respectively in this embodiment.

With the above-mentioned system of this embodiment, the rear part of the vehicle is prevented from having a shock or vibration when the rear wheel passes the bump or dip since the rear suspension characteristic is changed to the 'SOFT' state by decreasing the air spring constant before the rear wheel gets over the bump or dip of the road surface which the front wheel has passed. Especially because the rear wheel shock gives unpleasant vibration not only to the rear seat but also to the front seat, the prevention of the rear wheel shock is effective for the prevention of all the vehicle shocks to improve comfort of the ride.

In this embodiment, after the rear wheel passes the bump or dip which the front wheel has passed, the suspension characteristic which is changed to the 'SOFT' state is controlled to return to the 'NORMAL' state, whereby not only is comfort of the ride improved when the vehicle is passing the bump or dip, but the controllability and the stability are assured when the vehicle is driving on the plane road surface after passing the bump or dip.

In this embodiment, the rear air suspension is controlled to change to two phases, the 'NORMAL' state and the 'SOFT' state. However, if the way to control the suspension characteristic alteration actuators is changed, the damping force of the shock absorbers and the spring constant of the air spring are changed into more than two phases and if the controls are performed in combination, the suspension characteristic can be changed into more phases, which enables the suspension characteristic to be more finely tuned to the scale of the bump or dip when the vehicle passes the sporadic bump or dip.

In this embodiment, the spring constant of the air suspension or the damping force of the shock absorber can be changed. However, the vehicle height can be changed to a plurality of phases by using the compressed air feed and discharge system and the feed and discharge valves of each air suspension, whereby the above-mentioned way to adjust the vehicle height can be applied to the control when the vehicle is driving on the sporadic bump or dip.

In this embodiment, when the vehicle is driving on the sporadic bump or dip, the control is performed to improve comfort of the ride to change the rear suspension characteristic to the 'SOFT' state. However, another control can be performed to improve the controllability and the stability to change the rear suspension characteristic to the 'HARD' state.

Moreover, in this embodiment, after the prescribed time has elapsed since the rear vehicle height sensor detected the bump or dip, namely the rear wheel began to traverse the bump or dip, the rear wheel is considered to pass the bump or dip, whereby the rear suspension characteristic is returned to the original state. However, the control depending on the driving condition can be performed by calculating the above-mentioned prescribed time from the vehicle speed.

This invention is also capable of performing control to return the rear suspension characteristic to the original state after the vehicle height sensor detects that the value is within the prescribed one once the rear vehicle height sensor detects that the rear wheel has passed the bump or dip, namely the amplitude of the output signal of the rear vehicle height exceeds the prescribed value.

Figure 12A:
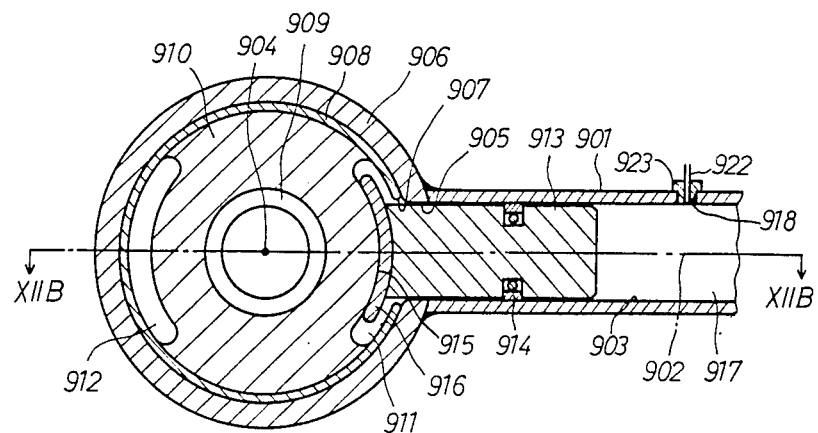
FIG. 12A is a vertical sectional view of an apparatus for altering a suspension characteristic as the first example.
Figure 12B:
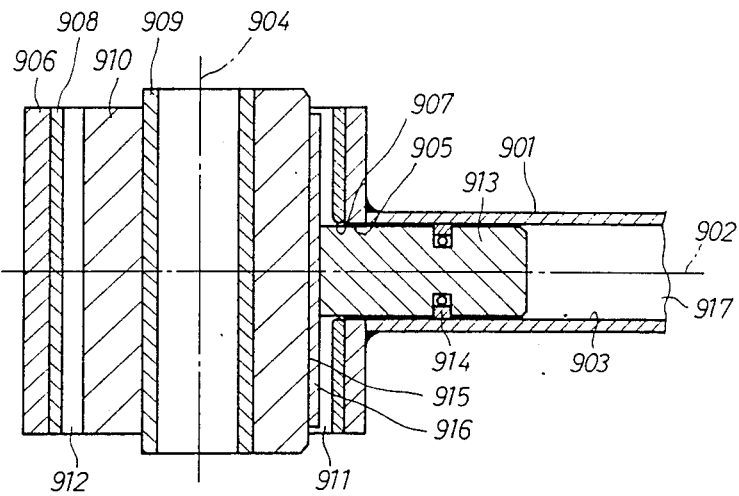
FIG. 12B is a cross-sectional view along a line XIIB—XIIB in FIG. 12A.

The followings are examples which are applied to the rear suspension characteristic alteration means other than the air suspension. The first example is bush for a joint of a suspension bar such as the upper and lower control arms of a suspension, as shown in FIGS. 12A and 12B. The bush is provided with a mechanism for changing the stiffness of the bush to alter the characteristic of a suspension. The changing of the stiffness corresponds to that of the spring constant or damping force of the bush.

FIG. 12A shows a longitudinal sectional view of the joint of the suspension bar. FIG. 12B shows a sectional view along a line XIIB—XIIB shown in FIG. 12A. A control arm 901 extends along an axis 904 perpendicular to the axis 902 is welded around the hole 905 at one end of the control arm 901. An outer cylinder 908 having a hole 907 is press-fitted in the sleeve 906. An inner cylinder 909 is provided in the outer cylinder 908 concentrically thereto. The bush 910 made of vibration-proof rubber is interposed between the outer cylinder 908 and the inner cylinder 909. The bush 910 and the outer cylinder 908 define openings 911 and 912 which are located in the face of each other along the axis 902 and extend as arcs around the axis 904, so that the stiffness in the direction of the axis 902 is set at a relatively low value.

The hole 903 of the control arm 901 constitutes a cylinder which supports piston 913 movably back and forth along the axis 902. A sealing member 914 is tightly packed in between the piston 913 and the inside surface of the hole 903. A contact plate 916 is secured at one end of the piston 913. The contact plate 1916 curves about the axis 904 and extends along the axis so that the plate is brought into tight contact with the inside surface 915 of the opening 911.

The same construction as shown in FIGS. 12A and 12B is provided at the other end of the control arm 901. A cylinder chamber 917 is defined between the piston 913 and another piston not shown in the drawings and fitted with the other end of the control arm 901. The cylinder chamber 917 communicates with the exterior through a tapped hole 918 provided in the control arm 901. A nipple 923 secured on one end 922 of a conduit connected to an oil pressure source not shown in the drawings is secured in the tapped hole 918 to apply oil pressure to the cylinder chamber 917. When the oil pressure in the cylinder chamber 917 is relatively low, the force pushing the piston 913 leftward as to the drawings is so weak that the piston is held in such a position shown in the drawings that the contact plate 916 is brought into light contact with the inner surface 915 of the bush 910. As a result, the stiffness of the bush 910 in the direction of the axis 903 is made relatively low.

When the oil pressure in the cylinder chamber 917 is relatively height, the piston 913 is driven leftward as to the drawings and the contact plate 916 pushes the inner surface 915 of the bush 910 so that the portion of the bush between the contact plate and the inner cylinder 909 is compressed. As a result, the stiffness of the bush 910 in the direction of the axis 902 is heightened.

If the suspension bar is provided between the body and rear wheel of a vehicle, the characteristic of the suspension for the rear wheel can be altered by regulating the oil pressure in the cylinder chamber 917 through the action of an actuator such as a pressure control valve. When the oil pressure is heightened by an instruction from ECU 4, the stiffness of the bush 910 is enhanced to increase the damping force and spring constant of the suspension to improve the controllability and the stability of the vehicle. When the oil pressure is lowered, the shock at the rear portion of the vehicle is reduced.

Figure 13A:
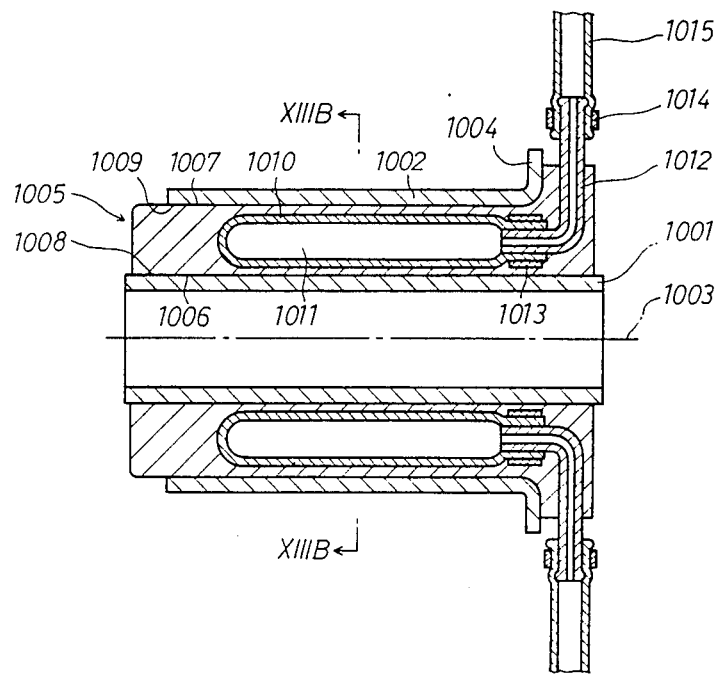
FIG. 13A is a sectional view of another apparatus for altering the suspension characteristic as the second example.
Figure 13B:
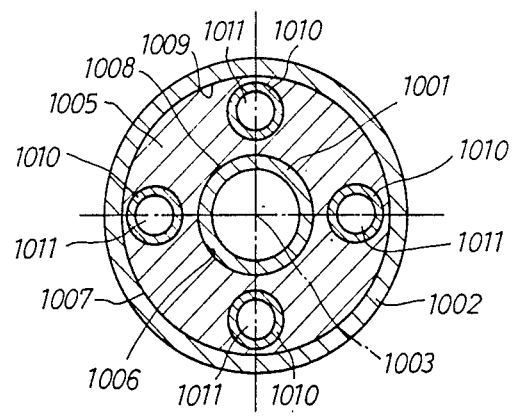
FIG. 13B is a cross-sectional view along a line XIIIB—XIIIB in FIG. 13A.

The second example is another bush shown in FIGS. 13A and 13B and having the same function as the former. FIG. 13A shows a longitudinal sectional view of the bush constructed together with an inner and an outer cylinders as a bush assembly. FIG. 13B shows a sectional view along a line XIIIB—XIIIB shown in FIG. 13A.

Four expansible and compressible dip bags 1010, which extend along an axis 1003 and are separately located in equiangular positions around the axis, are embedded in the bush 1005, and define four chambers 1011 extending along the axis 1003 and separately located in equiangular positions around the axis. Each dip bag 1010 is secured at one end on one end of a coupler 1012 embedded in the bush 1005, by a clamp 1013, so that the chamber 1011 communicates with the exterior of the bush through the coupler 1012. One end of a hose 1015 is fixedly connected to the other end of the coupler 1012 by clamp 1014, and the other end of the hose 1015 is connected to a compressed air source through an actuator such as a pressure control valve (not shown), so that controlled air pressure can be introduced into each chamber 1011.

When the actuator is put in operation by ECU 4, the air pressure in each chamber 1011 can be varied to change the stiffness of the bush in a stepless manner. The stiffness of the bush can thus be appropriately changed to be high (hard) or (soft) after a shock at the front wheel of a vehicle is detected.

Figure 14A:
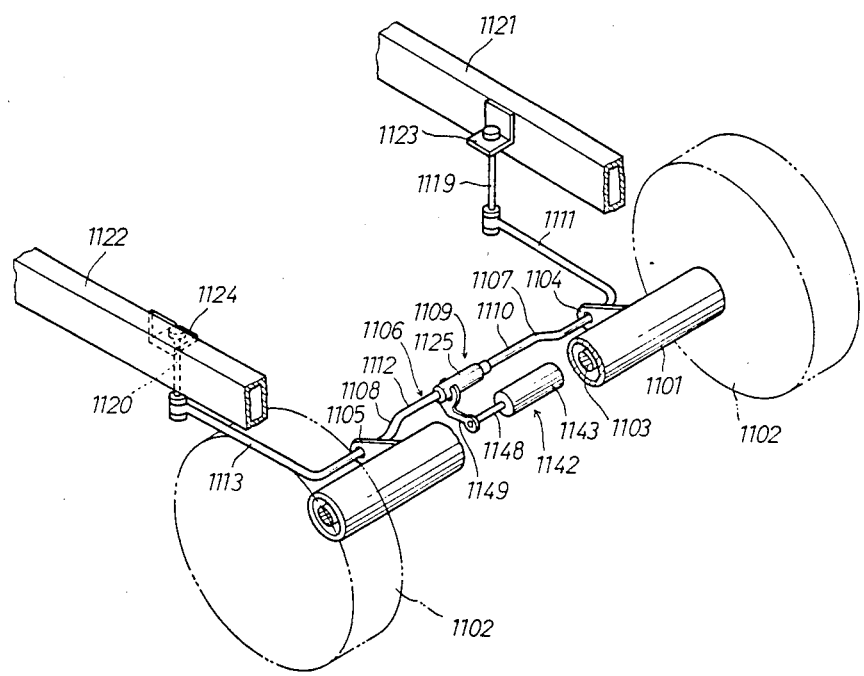
FIG. 14A is a perspective view of another apparatus for altering the suspension characteristic as the third example.
Figure 14B:
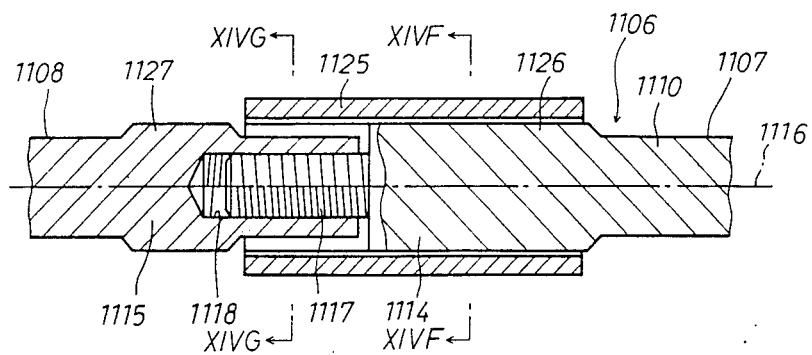
FIGS. 14B and 14C are detail views in partial sections of FIG. 14A.
Figure 14C:
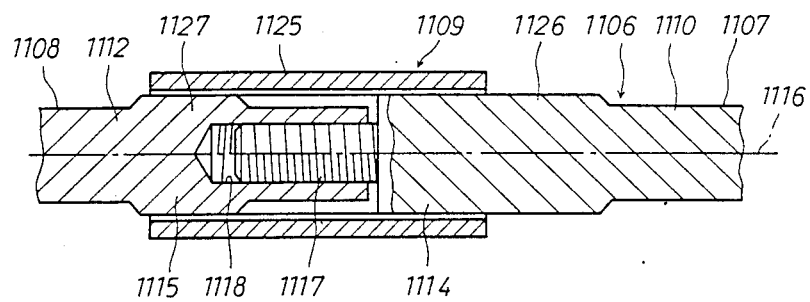
Figure 14D:
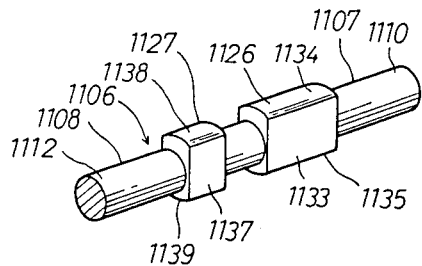
FIG. 14D is a partial perspective view of FIG. 14A.
Figure 14E:
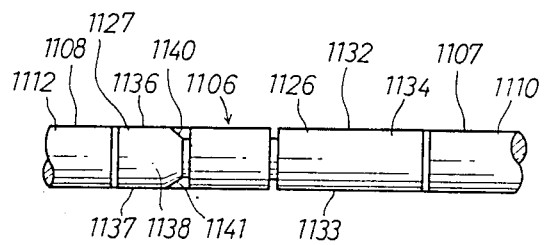
FIG. 14E is a plan view in FIG. 14D.
Figure 14F:
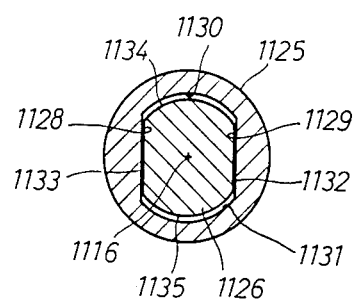
FIG. 14F is a cross-sectional view along a line XIVF—XIVF in FIG. 14B.
Figure 14G:
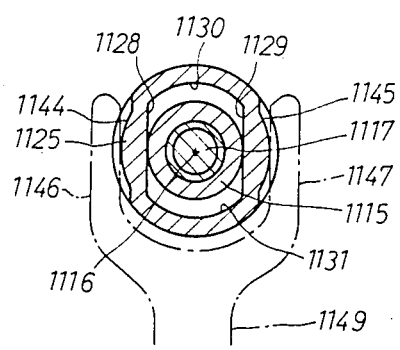
FIG. 14G is a cross-sectional view along a line XIVG—XIVG in FIG. 14B.

FIGS. 14A–14G show a system of a stabilizer as the third example. FIG. 14A shows a exploded oblique view of the torsion-bar-type stabilizer built in the axle-type rear suspension of an automobile. FIGS. 14B and 14C show enlarged partial longitudinal sectional views of the main part of the stabilizer in the coupled and uncoupled states thereof. FIGS. 14D shows an oblique view of the main part shown in FIGS. 14B and 14C and removed of a clutch. FIG. 14E shows a plan view of the main part shown in FIG. 14D. FIG. 14F shows a sectional view along a line XIVF—XIVF shown in FIG. 14B. FIG. 14G shows a sectional view along a line XIVG—XIVG shown in FIG. 14B.

An axle 1103 coupled with wheels 1102 is rotatably supported by an axle housing 1101. A pair of brackets 1104 and 1105 are secured on the axle housing 1101, in positions separated from each other in the direction of the width of the automobile.

The torsion-bar-type stabilizer 1106 is coupled to bushes (not shown). The stabilizer 1106 includes a right portion 1107 and the left portion 1108 can be selectively coupled to each other integrally by a coupling unit 1109. A protrusion 1117 and a hole 1118, which extend along an axis 1116, are formed at the ends 1114 and 1115 of rods 1110 and 1112 opposite arms 1111 and 1113, and are provided with a male screw and a female screw which are engaged with each other to couple the rods 1110 and 1112 rotatably relative to each other around the axis 1116. The tips of the arms 1111 and 1113 are coupled to brackets 1123 and 1124 secured on the side frames 1121 and 1122 of the vehicle, by links 1119 and 1120.

The coupling unit 1109 includes the cylindrical clutch 1125, a clutch guide 1126 which is provided at one end 1114 of the rod 1110 and supports the clutch 1125 unrotatably relative to the guide around the axis 1116 but movably back and forth along the axis, and a clutch bearer 1127 which is provided at the end 1115 of the rod 1112 and bears the clutch 1125 unrotatably relative to the bearer around the axis 1116. The inside circumferential surface of the clutch 1125 includes planes 1128 and 1129 facing each other across the axis 1116 and extending in parallel with each other along the axis, and partially cylindrical surfaces 1130 and 1131 adjoining the planes in positions opposed to each other across the axis 1116, as shown in FIGS. 14F and 14G. Correspondingly to the inside circumferential surface of the clutch 1125, the peripheral surface of the clutch guide 1126 includes planes 1132 and 1133 facing each other across the axis 1116 and extending in parallel with each other across the axis, and partially cylindrical surfaces 1134 and 1135 adjoining the planes in position opposed to each other axis 1116. The peripheral surface of the clutch bearer 1127 include planes 1136 and 1137 facing each other across the axis 1116 and extending in parallel with each other along the axis, and partially cylindrical surfaces 1138 and 1139 are always engaged with those 1128 and 1129 of the clutch 1125.

When the clutch 1125 is in a position shown in FIG. 14C, the planes 1136 and 1137 of the clutch bearer 1127 are also engaged with those 1129 and 1128 so that the right portion 1107 and left portion 1108 of the stabilizer are integrally coupled to each other unrotatably relative to each other around the axis 1116. The ends of the planes 1136 and 1137 of the clutch bearer 1127 at the right portion 1107 of the stabilizer are chamfered at 1140 and 1141 so that even if the rods 1110 and 1112 are slightly rotated relative to each other around the axis 1116, the clutch 1125 can be moved from a position shown in FIG. 14B to a position shown in FIG. 14C, to couple the right portion 1107 and left portion 1108 of the stabilizer integrally to each other as the arms 1111 and 1113 of the portions are on the same plane.

The clutch 1125 is moved back and forth along the axis 1116 by an actuator 1142 regulated by ECU 4. The actuator 1142 includes a hydraulic piston-cylinder unit 1143 secured on a differential casing not shown in the drawings, and a shifting fork 1149 which includes arms 1146 and 1147 engaged in the grooves 1144 and 1145 of the peripheral surface of the clutch 1225, as shown in FIG. 14G, and is coupled to the piston rod 1148 of the piston-cylinder unit 1143.

When the clutch 1125 is placed in a position shown in FIG. 14C, by the actuator 1142 according to an instruction from ECU 4, the right portion 1107 and left portion 1108 of the stabilizer 1016 are integrally coupled to each other to put the stabilizer in such a state that it can fulfill its function to reduce the rolling of the vehicle to improve its controllability and stability. When the clutch 1125 is placed in a position shown in FIG. 14B, by the actuator 1142, the right portion 1107 and left portion 1108 of the stabilizer 1016 can be rotated relative to each other around the axis 1116 to reduce the shock on the vehicle, particularly the shock on its wheels on only one side of the vehicle, or improve comfort of ride of the vehicle.

Figure 15A:
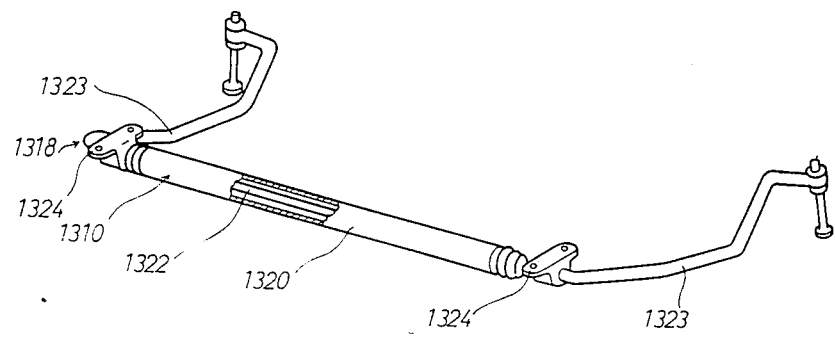
FIG. 15A is a perspective view of another apparatus for altering the suspension characteristic as the fourth example.
Figure 15B:
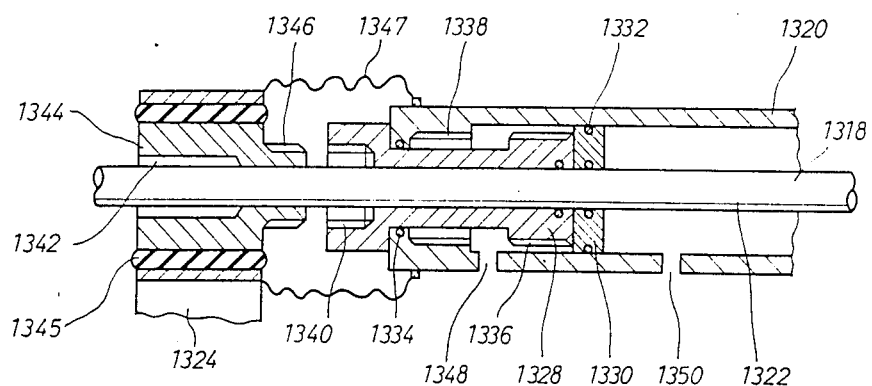
FIG. 15B is detail view in a cross section in FIG. 15A.

FIGS. 15A and 15B show another stabilizer as the fourth example. A stabilizer-bar-type assembly 1310 includes a first stabilizer bar 1318 and a second stabilizer bar 1320, as shown in FIG. 15A. The first stabilizer bar 1318 includes a main portion 1322 and an arm 1323. The main portion 1322 is attached to the vehicle body by a pair of fitting metals 1325 so that the main portion 1322 can be twisted around its axis.

The second stabilizer bar 1320 is disposed so that the main portion 1322 of the first stabilizer bar 1318 extends through the second stabilizer bar, as shown in FIG. 15B. The second stabilizer bar 1232 is disposed inside the pair of fitting metals 1324 so that the first stabilizer bar 1318 can be connected to and disconnected from the second stabilizer. A piston 1330 on which a spool 1328 is secured is slidably disposed inside one end of the second stabilizer bar 1320 in such a manner that the piston is liquid-tightly sealed by a sealing member 1332. The spool 1328 is liquid tight sealed by a sealing member 1334, and projects out of the second stabilizer bar 1320. The spool 1328 has splines 1336 near the pistons 1330, while the second stabilizer bar 1320 has, at one end, splines 1338 which can be engaged with the splines 1336. The spool 1328 has other splines 1340 inside the outwardly projecting end of the spool. A coupler 1344 is connected to the main portion 1322 of the first stabilizer bar 1318 by splines 1342. Splines 1346, which can be engaged with the splines 1340, are provided on the coupler 1344 at the end opposed to the spool 1328.

The coupler 1344 is connected to a mounting metal 1324 through a rubber bush 1345, as shown in FIG. 15B, so that the main portion 1322 of the first stabilizer bar 1318 is twisted by deforming the coupler 1344 is fitted in such a position that the splines 1340 are engaged with the splines 1346 when the spool 1328 is moved leftward as to the drawings and the splines 1336 are engaged with the splines 1338. A bellowslike boot 1347 for protecting the splines 1340 and 1346 from dust is provided between the coupler 1344 and the second stabilizer bar 1320. Two ports 1348 and 1350 are provided in the second stabilizer bar 1320 in such a manner that the piston 1330 is located between the ports. Piping is provided to lead a pressure fluid to the ports 1348 and 1350 in use.

When the pressure fluid is led to one port 1350 through an actuator such as a pressure control valve, the piston 1330 is moved leftward as to the drawings, together with the spool 1328, the splines 1336 are engaged with the splines 1338, and the splines 1340 are engaged with the splines 1346. As a result, the first and the second stabilizer bars 1318 and 1320 are coupled to each other so that the stiffness of the stabilizer bar assembly is heightened. When the pressure fluid is led to the other port 1348, the piston 1330 is moved rightward and the splines are disengaged from each other. As a result, the stiffness of the stabilizer bar assembly is constituted by only that of the first stabilizer bar 1318.

Figure 16A:
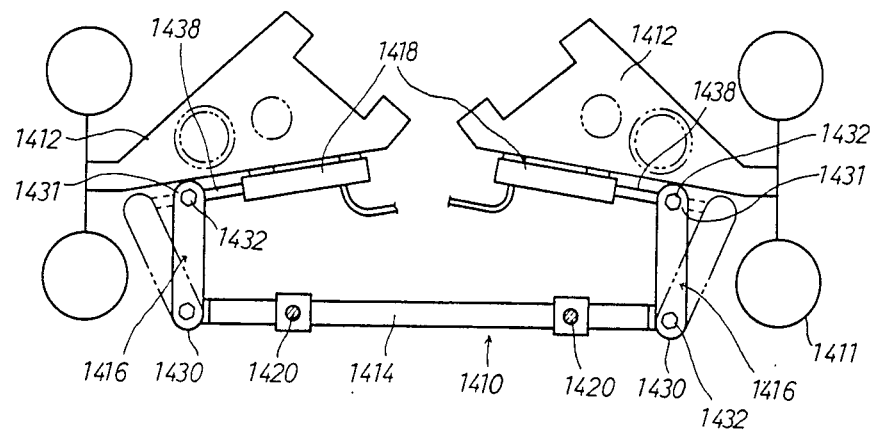
FIG. 16A is a plan view of another apparatus for altering suspension characteristic as the fifth example.
Figure 16B:
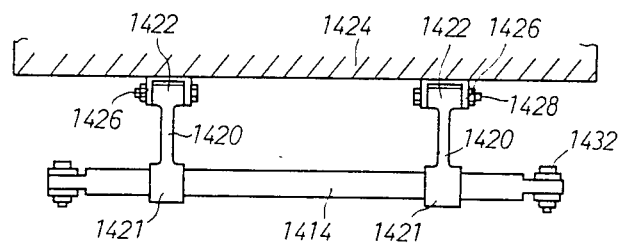
FIG. 16B is a partly pictorical view in FIG. 16A.
Figure 16C:
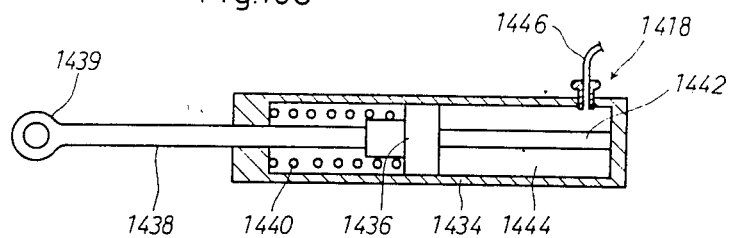
FIG. 16C is a sectional view of a stretching means.

FIGS. 16A, 16B and 16C show still another stabilizer as the fifth example. FIG. 16A shows a plan view of the outline of the stabilizer 1410. Wheels 1411 and suspension arms 1412 are also shown in FIG. 16A. A main part 1414, a pair of arms 1412 are also shown in FIG. 16A. A main part 1414, a pair of arms 1516 and elongation means 1518 are provided.

The main part 1414 like a round bar is laid through the bearing portions 1421 of a pair of links 1420 disposed at a distance from each other in the direction of the width of the body 1424 of a vehicle, and is supported by the bearing portions 1421 so that the main part 1414 can be twisted around its axis. The other bearing portions 1422 of the links 1420 at the upper ends are rotatably supported by pins 1428 extending through brackets 1426 welded on the vehicle body 1424. As a result, the main part 1414 is disposed along the width of the vehicle body, and can be twisted relative to the vehicle body.

The pair of arms 1416 are made of flat bars. The first ends 1430 of the arms 1416 are coupled to the ends of the main part 1414 by blots and nuts 1432 so that the arms can be turned about vertical axes. The second ends 1431 of the arms 1416 are located at a distance froam the first ends 1430 in the front-to-rear direction of the vehicle body 1424. The front-to-rear direction includes an oblique longitudinal direction.

The second ends 1431 of the arms 1416 are displaced in the direction of the width of the vehicle body 1424 by the elongation means 1418 made of power cylinders. Each of the power cylinders includes a cylinder 1434, a piston 1436 liquid-tight and slidably fitted in the cylinder 1434, a piston rod 1438 coupled at one end to the piston 1416 and projecting at the other end out of the cylinder 1434, and a included spring 1440 for displacing the piston 1436 in such a direction as to retract the piston rod 1438. A stopper 1442 secured on the piston 1436 prevents the piston from being displaced more than a predetermined quantity.

The cylinder 1434 is secured on the suspension arm 1412 in such a manner that the piston rod 1438 is located more outside than the cylinder 1434 in the direction of the width of the vehicle body. The second end 1431 of the arm 1416 is coupled to the outwardly projecting end of the piston rod 1438 by a bolt and nut 1432 so that the arm 1416 can be turned about the vertical axis.

One end of a flexible hose 1446 is connected to the liquid chamber 1444 of the cylinder 1434 opposite the side on which the included spring 1440 is located. The other end of the flexible hose 1446 is connected to a pressure generator (not shown) through an actuator such as pressure control valve.

Unless pressure is applied to the liquid chambers 1444 of the power cylinders according to the state of the actuator corresponding to an instruction from ECU 4, the second end 1431 of the arms 1416 are located in inner positions as shown in FIG. 16A, so that the wheel rate of the stabilizer is low.

When the actuator is operated to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as shown by imaginary lines, i.e. double dotted lines, in FIG. 16A, to increase the arm ratio of the stabilizer to heighten its stiffness against the rolling of the vehicle.

Figure 17A:
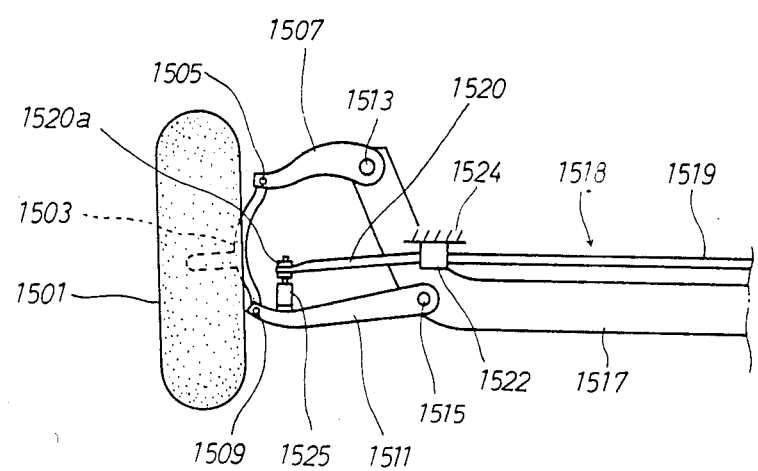
FIG. 17A is a partly plan view of another apparatus for altering the rear suspension characteristic as the sixth example.
Figure 17B:
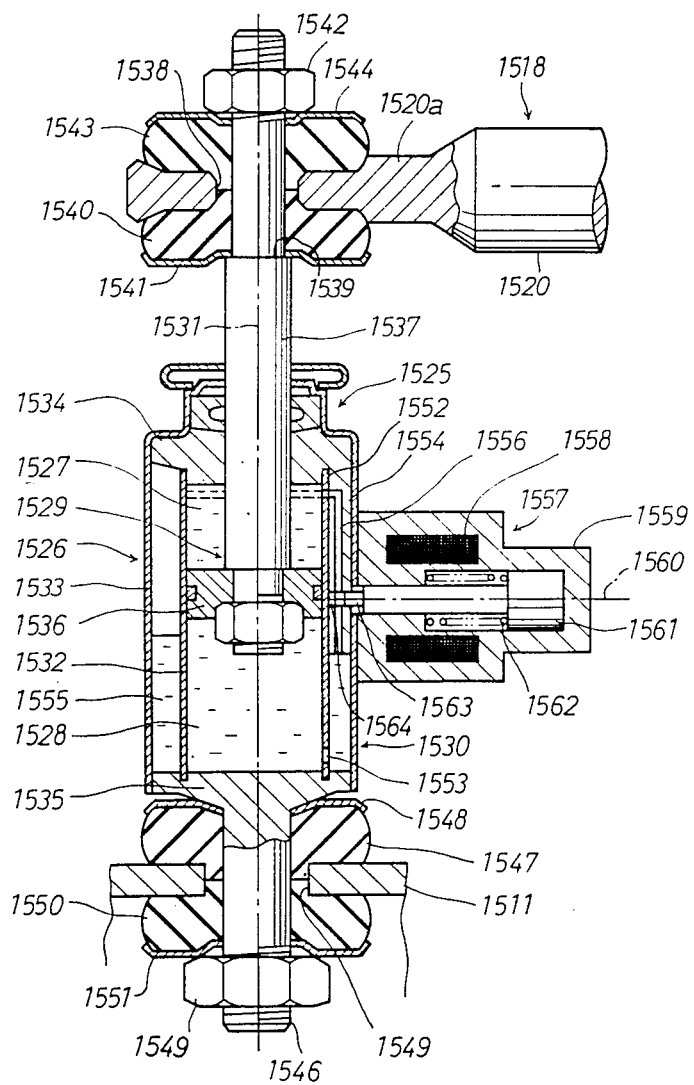
FIG. 17B is a detail view of connecting apparatus in a cross section in FIG. 17A.

FIGS. 17A and 17B show a system of a coupling unit for a stabilizer and a lower control arm, as the sixth example. FIG. 17A shows a partial front view of a wishbone-type suspension including the coupling unit for the stabilizer for a vehicle. FIG. 17B shows an enlarged sectional view of the coupling unit shown in FIG. 17A. A wheel 1501 is rotatably supported by a knuckle 1503. The knuckle 1503 is pivotally coupled at the upper end to one end of an upper control arm 1507 by a pivot 1505, and pivotally coupled at the other end to one end of the lower control arm 1511 by a pivot 1509. The upper control arm 1507 and the lower control arm 1511 are pivotally coupled to the cross member 1517 of the vehicle by pivots 1513 and 1515.

The stabilizer 1518, which is U-shaped is disposed along the width of the vehicle. The stabilizer 1518 is coupled at its central rod 1519 to the body 1524 of the vehicle by brackets 1522 with rubber bushes not shown in the drawings, so that the stabilizer can be turned about its axis. The tip 1520a of the arm 1520 of the stabilizer 1518 is coupled to a point near one end of the lower control arm 1511 by the coupling unit 1525.

The coupling unit 1525 includes a piston-cylinder assembly 1526 composed of a piston 1529 and a cylinder 1530 which define two cylinder chambers 1527 and 1528. The cylinder 1530 includes an inner cylinder 1532 which supports the piston 1529 movably back and forth along an axis 1531, and outer cylinder 1533 disposed substantially concentrically to the inner cylinder 1532, and end caps 1534 and 1535 which close both the ends of the inner cylinder and the outer cylinder. The piston 1529 includes a main portion 1536, and a piston rod 1537 which bears the main portion 1536 at one end of the piston rod and extends along the axis 1131 through the end cap 1534 and the hole 1538 of the tip of the arm 1520 of the stabilizer 1518.

A rubber bush 1540 and a retainer 1541 for holding the bush are interposed between the shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped.

The inner cylinder 1532 is provided with through holes 1552 and 1553 near the end caps 1534 and 1535. The end cap 1534 is integrally provided with a projection 1554 extending along the axis 1531 between the inner cylinder 1532 and the outer cylinder 1533 and located in tight contact with the inner and the outer cylinders. The projection 1554 has an internal passage 1556 which is coincident at one end with the through hole 1552 and is opened at the other end into an annular space 1555 between the inner cylinder 1532 and the outer cylinder 1533. As a result, the through hole 1552, the internal passage 1556, the annular space 1555 and the other through hole 1553 constitute a passage means for connecting both the cylinder chambers 1527 and 1528 to each other. A portion of the annular space 1555 is filled with air. Portions of the cylinder chambers 1527 and 1528, the internal passage 1556 and the annular 1555 are filled with oil. The change in the volume of the piston rod 1537 in the cylinder 1530, which is caused by the displacement of the piston 1529 relative to the cylinder, is compensated by the compression or expansion of the air filled in the portion of the annular space 1555.

The connection of the internal passage 1556 is selectively controlled by normally-opened solenoid valve 1557. The solenoid valve 1557 includes a housing 1559 containing a solenoid 1558 and secured at one end on the outer cylinder 1533, a core 1561 supported in the housing 1559 movably back and forth along an axis 1560, and a compressed helical spring 1562 for urging the core 1561 rightward as to FIG. 17B. A valve element 1563 is integrally provided at one end of the core 1561 so that the valve element is selectively fitted into a hole 1564 extending in the projection 1554 across the internal passage 1556.

When no electricity is applied to the solenoid 1558 according to an instruction from ECU 4, the core 1561 is urged rightward as to the drawing, by the compressed helical spring 1562, to open the valve 1557 to allow the connection of the internal passage 1556. When electricity is applied to the solenoid 1558 according to an instruction from ECU 4, the core 1561 is driven leftward as to the drawings, against the force of the compressed helical spring 1562, to fit the valve element 1563 into the hole 1564 to shut the internal passage 1556. At that time, the cylinder chambers 1527 and 1528 are disconnected from each other, and the oil in the cylinder chambers is kept from flowing to the opposite cylinder chambers, so that the piston 1529 is hindered from moving relative to the cylinder 1530 along the axis 1531. As a result, the stabilizer 1518 is put in such a state that it can fulfill its function to suppress the rolling of the vehicle to improve the controllability and the stability of the vehicle as its wheel on one side moves up on a bump of a road surface for the vehicle and down into a dip of a road surface.

When no electricity is applied to the solenoid 1558, the solenoid valve 1557 is maintained in an open position shown in FIG. 17B, so that the oil in both the cylinder chambers 1527 and 1528 can freely flow to the opposite cylinder chambers through the internal passage 1556 and so forth. As a result, the piston 1529 can freely move relative to the cylinder 1530 so that the tips of both the right and left arms 1520 can freely move relative to the corresponding lower control arms 1511. For that reason, the stabilizer does not fulfill its function, so that the shock at each rear wheel of the vehicle is reduced to keep comfort of ride of the vehicle good.

What is claimed is:

1. A rear suspension controller for a vehicle having a suspension between a vehicle body and a rear wheel comprising:

a front vehicle height detecting means for measuring a distance between the vehicle body and a front wheel and for generating a front data signal;

a first judgment means for comparing the front data signal with a first preset range and for generating a first judgment signal if the first data signal is out of the first preset range;

a rear vehicle height detecting means for measuring distance between the vehicle body and a rear wheel and for generating a rear data signal;

a second judgment means for comparing the rear data signal with a second preset range and for generating a second judgement signal if the rear data signal is out of the second preset range; and a rear suspension characteristic alteration means for altering a rear suspension characteristic on receiving the first judgment signal and for returning the suspension characteristic to an unaltered state after receiving the second judgment signal.

2. A rear suspension controller according to claim 1, wherein the rear suspension characteristic alteration means returns the suspension characteristic a time interval which is determined in response to the vehicle speed after receiving the second judgment signal.

3. A rear suspension controller according to claim 1, wherein the second judgment means generates the second judgment signal when the rear data signal ($|VHR(S)-VHR(CR)|$) is first within the preset range after the rear data signal has been out of the preset range.

4. A rear suspension controller according to claim 1, wherein the rear suspension characteristic alteration means alters a spring constant of rear air suspensions as the rear suspension characteristic.

5. A rear suspension controller according to claim 1, wherein the rear suspension characteristic alteration means alters a damping force of rear shock absorbers as the rear suspension characteristic.

6. A rear suspension controller according to claim 4, wherein the rear suspension characteristic alteration means alters the rear vehicle height by feeding or discharging the air of the air suspensions.

7. A rear suspension controller according to claim 1, wherein the rear suspension characteristic alteration means alters a stiffness of bushes fitted at joints of control arms of the rear suspensions.

8. A rear suspension controller according to claim 1, wherein the rear suspension characteristic alteration means alters a compliance of a stablizer of the rear suspensions.

* * * * *